US008412688B1

(12) United States Patent
Armangau et al.

(10) Patent No.: US 8,412,688 B1
(45) Date of Patent: *Apr. 2, 2013

(54) DELEGATED REFERENCE COUNT BASE FILE VERSIONING

(75) Inventors: Philippe Armangau, Acton, MA (US); William Davenport, Burlington, MA (US); Jean-Pierre Bono, Westboro, MA (US); Sairam Veeraswamy, South Grafton, MA (US); Sitaram Pawar, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,224

(22) Filed: Sep. 2, 2011

Related U.S. Application Data

(63) Continuation-in-part of application No. 12/494,115, filed on Jun. 29, 2009, now Pat. No. 8,032,498.

(51) Int. Cl.
*G06F 17/00* (2006.01)
(52) U.S. Cl. .................... 707/695; 707/703; 707/690
(58) Field of Classification Search .................. 707/703, 707/690, 695, 697, 758
See application file for complete search history.

(56) References Cited

U.S. PATENT DOCUMENTS

| 4,945,475 | A | 7/1990 | Bruffey et al. |
| 5,204,958 | A | 4/1993 | Cheng et al. |
| 5,218,696 | A | 6/1993 | Baird et al. |
| 5,893,140 | A | 4/1999 | Vahalia et al. |
| 6,029,166 | A | 2/2000 | Mutalik et al. |
| 6,389,433 | B1 | 5/2002 | Bolosky et al. |
| 6,477,544 | B1 | 11/2002 | Bolosky et al. |
| 6,535,869 | B1 | 3/2003 | Housel, III |
| 6,799,248 | B2 | 9/2004 | Scherr |
| 6,895,418 | B1 | 5/2005 | Crow et al. |
| 6,934,725 | B1 | 8/2005 | Dings |
| 7,277,899 | B1 | 10/2007 | Salyzyn |
| 7,574,560 | B2 | 8/2009 | MacHardy et al. |
| 8,032,498 | B1 | 10/2011 | Armangau et al. |
| 8,055,613 | B1 | 11/2011 | Mu et al. |
| 2005/0065986 | A1* | 3/2005 | Bixby et al. ................. 707/204 |

OTHER PUBLICATIONS

Uresh Vahalia, Unix Internals: The New Frontiers, 1996, p. 187-290, 338-371, Prentice-Hall, Inc., Upper Saddle River, New Jersey.
L. W. McVoy & S. R. Kleiman, "Extent-like Performance from a UNIX File System," USENIX—Winter '91, Jan. 21-25, 1991, 12 pages, Dallas, TX, Sun Microsystems, Santa Clara, CA.
"Extent (file systems)," Wikipedia, May 29, 2007, 2 pages, Wikimedia Foundation Inc., St. Petersburg, FL.
"B Tree," Wikipedia, Aug. 5, 2011, 13 pages, Wikimedia Foundation Inc., St. Petersburg, FL.
FIPS Publication 180-2 Secure Hash Standard, Aug. 1, 2002, 83 pages, National Institute of Standards and Technology, Gaithersburg, MD.
Refcount Data Allocator, Programming Guide for Squid Web Proxy Wiki, 3 pages, May 18, 2008, wiki.squid-cache.org.

* cited by examiner

*Primary Examiner* — Belix M Ortiz Ditren
(74) *Attorney, Agent, or Firm* — Richard Auchterlonie; Novak Druce Connolly Bove + Quigg LLP

(57) ABSTRACT

A snapshot copy facility maintains information indicating ownership and sharing of child nodes in the hierarchy of a file between successive versions by delegating reference counts to the parent-child relationships between the nodes, as indicated by pointers in the parent nodes. When a child node becomes shared between a parent node of the production file and a parent node of a snapshot copy, the delegated reference count is split among the parent nodes. This method is compatible with a conventional data de-duplication facility, and avoids a need to update reference counts in metadata of child nodes of a shared intermediate node upon splitting the shared intermediate node when writing to a production file.

20 Claims, 34 Drawing Sheets

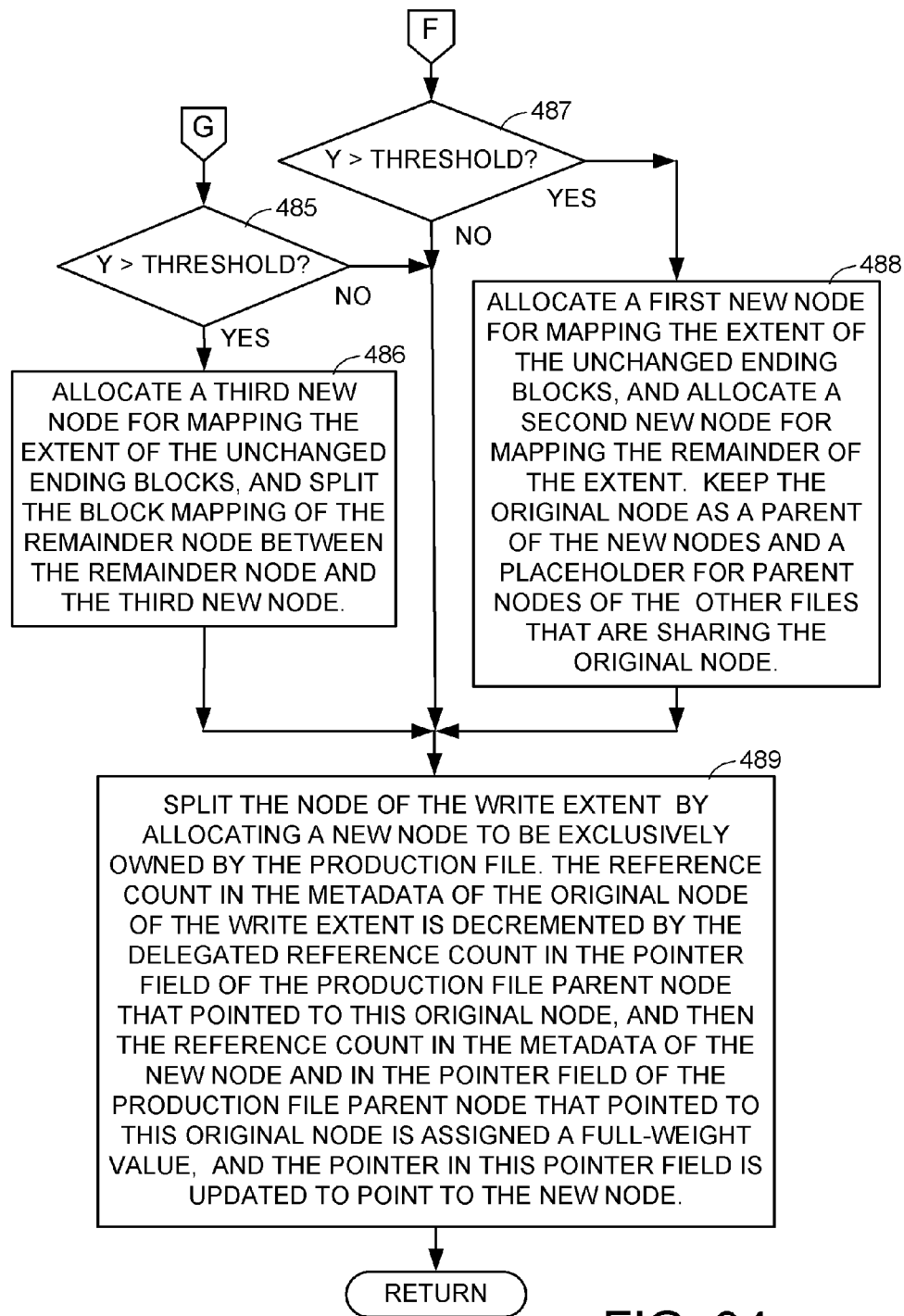

```
┌─────────────────────────────────────────────┐
│ SNAPSHOT COPY AND DATA DE-DUPLICATION USING │
│ DELEGATED WEIGHTED REFERENCE COUNTS FOR     │
│ INDICATING EXCLUSIVE OWNERSHIP OF           │
│ INTERMEDIATE NODES AND EXTENT DESCRIPTORS   │
└─────────────────────────────────────────────┘
                      ▼                     ╱―501
┌─────────────────────────────────────────────┐
│ INITIALLY ASSIGN A FULLY WEIGHTED REFERENCE │
│ COUNT TO EACH CHILD NODE POINTER FIELD IN   │
│ THE PRODUCTION FILE INODE AND EACH          │
│ INTERMEDIATE NODE AND IN THE METADATA OF    │
│ EACH INTERMEDIATE NODE AND EACH EXTENT      │
│ DESCRIPTOR OF THE PRODUCTION FILE           │
└─────────────────────────────────────────────┘
                      ▼                     ╱―502
┌─────────────────────────────────────────────┐
│ INVOKE THE SNAPSHOT COPY FACILITY AND THE   │
│ DATA DE-DUPLICATION FACILITY FOR OPERATION  │
│ UPON THE PRODUCTION FILE                    │
└─────────────────────────────────────────────┘
                      ▼
              ┌──────────────────┐
              │ DATA DE-DUPLICATION │
              │     FACILITY       │
              └──────────────────┘
                      ▼                     ╱―503
┌─────────────────────────────────────────────┐
│ EACH TIME THAT THE DATA DE-DUPLICATION      │
│ FACILITY SHARES AN INTERMEDIATE NODE OR     │
│ EXTENT DESCRIPTOR (E.G. BECAUSE A FILE IS   │
│ CREATED OR EXTENDED OR NEW DATA IS WRITTEN  │
│ TO A FILE), THE DATA DE-DUPLICATION         │
│ FACILITY INCREMENTS THE REFERENCE COUNT IN  │
│ THE METADATA OF THE INTERMEDIATE NODE OR    │
│ EXTENT DESCRIPTOR BY A FULL WEIGHT          │
└─────────────────────────────────────────────┘
                      ▼                     ╱―504
┌─────────────────────────────────────────────┐
│ EACH TIME THAT THE DATA DE-DUPLICATION      │
│ FACILITY UN-SHARES AN INTERMEDIATE NODE OR  │
│ EXTENT DESCRIPTOR (E.G., BECAUSE A FILE IS  │
│ DELETED OR TRUNCATED OR NEW DATA IS WRITTEN │
│ TO A FILE), THE DATA DE-DUPLICATION         │
│ FACILITY DECREMENTS THE REFERENCE COUNT IN  │
│ THE METADATA OF THE INTERMEDIATE NODE OR    │
│ THE EXTENT DESCRIPTOR BY THE DELEGATED      │
│ REFERENCE COUNT ASSOCIATED WITH THE POINTER │
│ IN THE PARENT NODE. IF THE REFERENCE COUNT  │
│ IS DECREMENTED TO ZERO, THEN THE DATA DE-   │
│ DUPLICATION FACILITY DE-ALLOCATES THE       │
│ INTERMEDIATE NODE OR THE EXTENT DESCRIPTOR. │
└─────────────────────────────────────────────┘
                      ▼
```

FIG. 35

DELEGATED REFERENCE COUNT BASE FILE VERSIONING

RELATED APPLICATIONS

The present application is a continuation-in-part of Philippe Armangau et al., U.S. Ser. No. 12/494,115 filed Jun. 29, 2009, entitled "Delegated Reference Count Base File Versioning," which is incorporated herein by reference.

FIELD OF THE INVENTION

The present invention relates generally to file servers, and more particularly, to sharing of file system data blocks within a file, among versions of a file, and among otherwise unrelated files.

BACKGROUND OF THE INVENTION

The sharing of file system data blocks conserves data storage for storing files in a file server. The sharing of file system data blocks among versions of a file typically occurs when the file server has a file system based snapshot copy facility that periodically creates snapshot copies of certain production files or production file systems. The sharing of file system data blocks within a file and among unrelated files typically occurs when the file server has a file system based data de-duplication facility that eliminates from the data storage any file system data blocks containing duplicative data content.

Snapshot copies are in widespread use for on-line data backup. If a production file becomes corrupted, then the production file is restored with its most recent snapshot copy that has not been corrupted.

A file system based snapshot copy facility is described in Bixby et al. U.S. Patent Application Publication 2005/0065986 published Mar. 24, 2005, incorporated herein by reference. When a snapshot copy is initially created, it includes only a copy of the inode of the production file. Therefore the snapshot copy initially shares all of the data blocks as well as any indirect blocks of the production file. When the production file is modified, new blocks are allocated and linked to the production file inode to save the new data, and the original data blocks are retained and linked to the inode of the snapshot copy. The result is that disk space is saved by only saving the difference between two consecutive versions. Block pointers are marked with a flag indicating whether or not the pointed-to block is owned by the parent inode. A non-owner marking is inherited by all of the block's descendants. The block ownership controls the copying of indirect blocks when writing to the production file, and also controls deallocation and passing of blocks when deleting a snapshot copy.

A file system based data de-duplication facility permits a shared file system data block to be linked to more than one inode or indirect block. For example, data de-duplication is applied to a file when the file is migrated into the file server or when new data is written to the file. The new data is written to newly allocated file system data blocks marked as blocks that have not been de-duplicated, and an attribute of the file is set to indicate that a de-duplication process is in progress. Then the data de-duplication process searches a single-instance data store of de-duplicated blocks for a copy of the data in each data block marked as not yet de-duplicated. If a copy is found, then, in the inode or indirect block of the file, a pointer to the block marked as not yet de-duplicated is replaced with a pointer to the copy in the single instance data store, and a reference counter for the data block in the single-instance data store is incremented. If a copy is not found, then the block of new data is marked as de-duplicated and added to the single instance data store. Once the data de-duplication process has been applied to all of the data blocks of the file, then the attribute of the file is set to indicate that the de-duplication process is finished. Whenever a file is deleted, the reference counter for each data block of the file is decremented. Whenever a reference counter is decremented to zero, the storage of the corresponding data block is de-allocated by putting the data block on a free block list so that the storage of the data block becomes available for allocation for receiving new data.

SUMMARY OF THE INVENTION

Maintenance and use of the block sharing information such as ownership flags or reference counters is a factor limiting the performance of a file system based snapshot copy facility or data duplication facility. As described above, however, the file system based data duplication facility uses an entirely different mechanism for maintenance of block sharing information than the file system based snapshot copy facility. Yet it is desirable to include the file system based snapshot copy facility together with the data de-duplication facility in the same file server. It has been discovered that when a file system based snapshot copy facility is used together with a file system based data de-duplication facility, it is possible to use a more compatible method of maintaining and using block sharing information in the snapshot copy facility in order to obtain an increase in performance, especially when the snapshot copy facility writes to the production file or deletes a snapshot copy.

In accordance with a first aspect, the invention provides a method of operating a network file server. The network file server has a network adapter coupling the network file server to a data network of client computers, data storage storing files, and a data processor coupled to the data storage and the network adapter for access of the client computers to the files stored in the data storage. The files in the data storage are organized as a hierarchy including inodes and data blocks. The files stored in the data storage include a production file having a first data block in the hierarchy. The first data block is a descendant of the production file inode in the hierarchy. The method includes storing in the data storage a reference count for the first data block, and storing in the data storage a delegated reference count for the relationship of the production file inode and the first data block. The method further includes the data processor creating in the data storage a snapshot copy of the production file by allocating a snapshot copy inode and sharing the first data block between the production file inode and the snapshot copy inode so that the first data block becomes a descendant of the snapshot copy inode, and splitting the delegated reference count between the relationship of the production file inode and the first data block and the relationship of the snapshot copy inode and the first data block. The method further includes the data processor responding to a request from one of the client computers for writing data to the production file at an offset encompassed by the first data block by comparing the delegated reference count for the relationship of the production file inode and the first data block to the reference count for the first data block, and upon finding that the comparison indicates that the first data block is a shared block, allocating a second data block, writing to the second data block and decrementing the reference count for the first data block by the delegated reference count for the relationship of the production file inode and the first data block and linking the second data block to the production file inode in place of the first data block so that the second data block becomes a descendant of the production file inode and the first data block is no longer a descendant of the production file inode.

In accordance with another aspect, the invention provides a method of operating a network file server. The network file server has a network adapter coupling the network file server to a data network of client computers, data storage storing files, and a data processor coupled to the data storage and the network adapter for access of the client computers to the files stored in the data storage. The files in the data storage are organized as a hierarchy including inodes, intermediate nodes, and data blocks. The files stored in the data storage include a production file having a first intermediate node in the hierarchy. The first intermediate node is a descendant of the production file inode in the hierarchy. The method includes storing in the data storage a reference count for the first intermediate node, and storing in the data storage a delegated reference count for the relationship of the production file inode and the first intermediate node. The method further includes the data processor creating in the data storage a snapshot copy of the production file by allocating a snapshot copy inode and sharing the first intermediate node between the production file inode and the snapshot copy inode so that the first intermediate node becomes a descendant of the snapshot copy inode, and splitting the delegated reference count between the relationship of the production file inode and the first intermediate node and the relationship of the snapshot copy inode and the first intermediate node by setting a delegated reference count for the relationship of the snapshot copy inode and the first intermediate node to a value less than the delegated reference count for the relationship of the production file inode and the first intermediate node and decrementing the delegated reference count for the relationship of the production file inode and the first intermediate node by the value. The method further includes the data processor responding to a request from one of the client computers for writing data to the production file at an offset encompassed by the first intermediate node by comparing the delegated reference count for the relationship of the production file inode and the first intermediate node to the reference count for the first intermediate node, and upon finding that the comparison indicates that the first intermediate node is a shared intermediate node, allocating a second intermediate node and decrementing the reference count for the first intermediate node by the delegated reference count for the relationship of the production file inode and the first intermediate node and linking the second intermediate node to the production file inode in place of the first intermediate node so that the second intermediate node becomes a descendant of the production file inode and the first intermediate node is no longer a descendant of the production file inode, and writing the data to the production file at the offset encompassed by the first intermediate node.

In accordance with yet another aspect, the invention provides a network file server. The network file server includes a network adapter for coupling the network file server to a data network of client computers, data storage storing files, and a data processor coupled to the data storage and the network adapter for access of the client computers to the files stored in the data storage. The files in the data storage are organized as a hierarchy including inodes and data blocks. The files stored in the data storage include a production file having a first data block in the hierarchy. The first data block is a descendant of the production file inode in the hierarchy. The data storage stores a reference count for the first data block, and the data storage stores a delegated reference count for the relationship of the production file inode and the first data block. The data processor is programmed with a snapshot copy facility. The snapshot copy facility is executable by the data processor to create in the data storage a snapshot copy of the production file by allocating a snapshot copy inode and sharing the first data block between the production file inode and the snapshot copy inode so that the first data block becomes a descendant of the snapshot copy inode, and splitting the delegated reference count between the relationship of the production file inode and the first data block and the relationship of the snapshot copy inode and the first data block. The snapshot copy facility also is executable by the data processor to respond to a request from one of the client computers for writing data to the production file at an offset encompassed by the first data block by comparing the delegated reference count for the relationship of the production file inode and the first data block to the reference count for the first data block, and upon finding that the comparison indicates that the first data block is a shared block, allocating a second data block, writing to the second data block and decrementing the reference count for the first data block by the delegated reference count for the relationship of the production file inode and the first data block and linking the second data block to the production file inode in place of the first data block so that the second data block becomes a descendant of the production file inode and the first data block is no longer a descendant of the production file inode.

BRIEF DESCRIPTION OF THE DRAWINGS

Additional features and advantages of the invention will be described below with reference to the drawings, in which:

FIGS. 33 and 34 together comprise a flowchart of a method for splitting a shared node when writing to the extent mapped by the node in the extent-based file system of FIGS. 25 and 26; and FIGS. 35, 36, 37, 38, and 39 together comprise a flowchart of snapshot copy and data de-duplication using delegated weighted reference counts for indicating exclusive ownership of intermediate nodes and extent descriptors in the extent-based file system of FIGS. 25 and 26.

Figure 1:
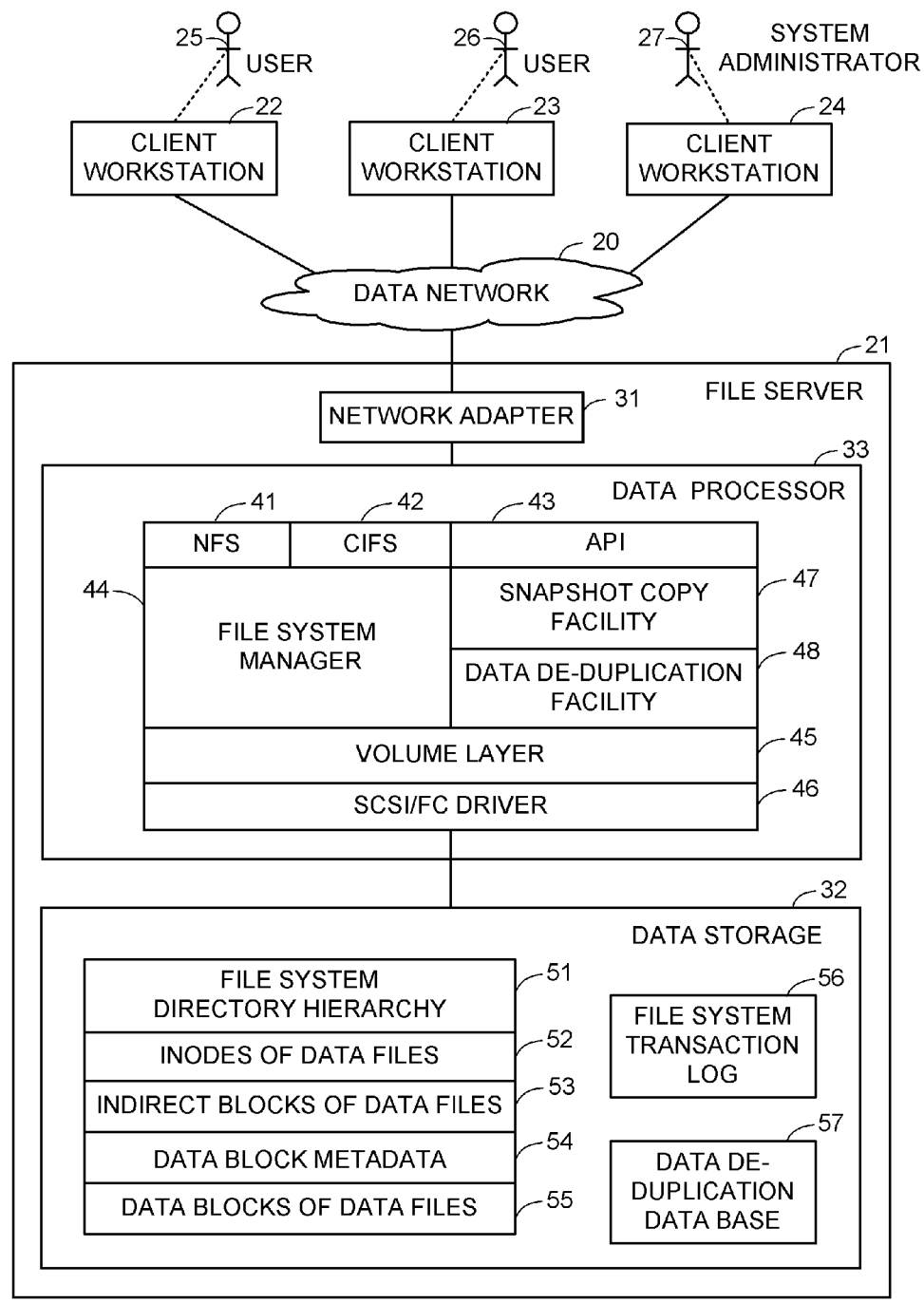
FIG. 1 is a block diagram of a data processing system including a network file server in accordance with the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing system including a data network 20 linking a network file server 21 to client workstations 22, 23, 24 operated by human users 25, 26, 27. The data network 20, for example, is an Ethernet or Internet Protocol (IP) data network. The user 27 is a system administrator responsible for configuration and maintenance of the data processing system.

The file server 21 includes a network adapter 31 linking the file server to the data network 20. The file server 21 also includes data storage 32 such as one or more disk drives. The file server 21 further includes a data processor 33 coupled to the network adapter 31 and programmed for responding to client requests for access to files in the data storage 32.

The data processor 33 is programmed with a number of program layers, including a Network File System (NFS) module 41, a Common Internet File System (CIFS) module 42, and an application program interface (API) module 43. The NFS module 41 recognizes file access commands received by the network adapter 31 from the client workstations 22, 23, 24 in accordance with the NFS protocol. The CIFS module 42 recognizes file access commands received by the network adapter 31 from the client workstations 22, 23, 24 in accordance with the CIFS protocol. For example, network clients such as UNIX (Trademark) workstations may use the Network File System (NFS) protocol to access files in the data storage 32 of the file server 21, and network clients such as Microsoft Windows (Trademark) workstations may use the Common Internet File System (CIFS) protocol to access files in the data storage 32 of the file server 21.

The application program interface (API) module 43 recognizes additional file access commands which may extend the functionality of the NFS and CIFS protocols. For example, if the NFS module 41 or the CIFS module 42 receives a file access request including an operation code that is not in accordance with the NFS or CIFS protocol, then the NFS module 41 or the CIFS module 42 will invoke the API module 43 in an attempt to execute the operation or function. The API module 43 may also respond to remote procedure calls from network clients in accordance with other network protocols, such as the Simple Network Management Protocol (SNMP) or the Hypertext Transfer Protocol (HTTP).

The data processor 33 is programmed with a file system manager 44 for managing a hierarchical file system in the data storage 32. A suitable kind of file system is the UNIX file system, as described in Chapter 9, pp. 261-289 of Uresh Vahalia, Unix Internals The New Frontiers, 1996, Prentice Hall, Inc., Simon & Schuster, Upper Valley River, N.J. 07458. The file system manager 44 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The data processor 33 is also programmed with a volume layer 45 for organizing the data storage 32 into logical volumes of data blocks, and a Small Computer System Interface (SCSI) or Fibre Channel (FC) driver 46 for linking the volume layer 45 to the data storage 32.

The data processor 33 is also programmed with a file system based snapshot copy facility 47. The snapshot copy facility 47 permits the sharing of file system blocks between a production file and snapshot copies of the production file. The snapshot copy facility 47 is similar to the snapshot copy facility described in Bixby et al. U.S. Patent Application Publication 2005/0065986 published Mar. 24, 2005, incorporated herein by reference, except that the snapshot copy facility 47 uses delegated reference counts instead of an ownership flag for maintaining block ownership information of the production files and snapshot copies, as will be further described below with reference to FIGS. 2 to 24.

The data processor 33 is also programmed with a file system based data de-duplication facility 48. The data de-duplication facility 48 permits a shared file system data block to be linked to more than one mode or indirect block of the same file or otherwise unrelated files. The data de-duplication facility 48 operates as described above to eliminate duplicate data blocks when a new file is migrated to the file server or when new data is written to an old file in the file server. If a block of a new file or a block of new data is found to contain the same data as a pre-existing data block in the data storage 32, then the block of the new file or the block of new data is replaced with the pre-existing data block by sharing the pre-existing data block with the new file or the old file, as will be further described below with reference to FIGS. 7 and 13.

As shown in the data storage 32 in FIG. 1, the file system is organized as a hierarchy. At the top of the hierarchy is a hierarchy of the directories 51 in the file system. Inodes of data files 52 depend from the file system directory hierarchy 51. Indirect blocks of data files 53 depend from the inodes of the data files. Data block metadata 54 and data blocks of data files 55 depend from the inodes of data files 52 and from the indirect blocks of data files 53. Specific examples of this hierarchy are further described below with reference to FIGS. 2 to 13.

The data storage 32 also stores a file system transaction log 56. For recovery of the file system upon re-boot of the file server, changes to the file system metadata in the data storage 32 are first written to the file system transaction log 56 before the changes are written to the file system in the data storage. Upon re-boot, the file system transaction log is inspected to find the last transaction recorded in the log, and then this last transaction is re-written to the file system in the data storage 32 to ensure that this last transaction has been completely written into the file system in the data storage.

The data storage 32 also stores a data de-duplication database 57 containing the logical block addresses and corresponding SHA-2 hash values for the data blocks in the single instance store. For example, the SHA-2 hash values are computed using the SHA-256 algorithm described in FIPS Publication 180-2 Secure Hash Standard, Aug. 1, 2002, 83 pages, National Institute of Standards and Technology, Gaithersburg, Md.

In order to determine whether or not the content of a new data block is already in the single instance store, the SHA-2 hash value is computed of the content of the new data block, and then the data de-duplication database 57 is searched for a data block having the same SHA-2 hash value. The content of the new data block is then compared to the content of any data blocks in the data de-duplication database 57 having the same SHA-2 value. If a match of the content is found, then the pointer to the new data block is replaced with a pointer to the matching block found in the data de-duplication database 57. Otherwise, the new data block is added to the data de-duplication database 57.

As introduced above, a file-system based snapshot copy facility needs a way of maintaining block ownership information for indicating whether or not each indirect block or data block of a production file or a snapshot copy of the production file is shared with another version of the production file. This block ownership information is accessed each time that the snapshot copy facility writes new data to a production file, and each time that the snapshot copy facility deletes a snapshot copy. It is desired to have a way of maintaining block ownership information that is compatible with the reference counts used in a conventional data de-duplication facility. It has been found, however, that there is a significant performance penalty if reference counts for data blocks are updated in the conventional fashion each time that the data blocks become shared or unshared among a production file and its snapshot copies; for example, when writing to the production file. This performance penalty is most sever when a shared indirect block is duplicated or "split" in order to perform a write to a data block depending from the shared indirect block in the file system block hierarchy, because a considerable amount of processing time is required to update reference counts in the metadata of all the child blocks of the shared indirect block.

In accordance with an aspect of the present invention, block ownership information for a snapshot copy facility is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks. As will be further described below, this method of using delegated reference counts for indicating whether a block is either exclusively owned or shared has the advantage of indicating block ownership in a way that is compatible between the snapshot copy facility and the use of reference counts by the data de-duplication facility, and that avoids the updating of reference counts in the metadata of child blocks when a shared indirect block is duplicated or "split" in order to perform a write to a data block depending from the shared indirect block in the file system block hierarchy.

Figure 2:
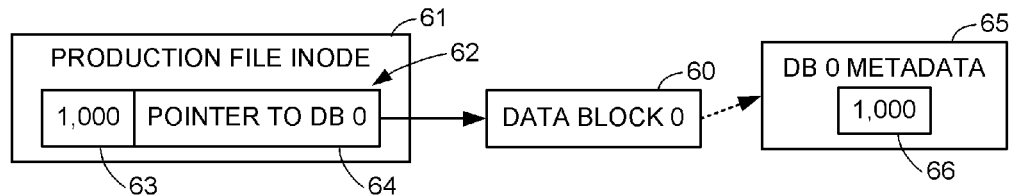
FIG. 2 is a block diagram of a production file using a reference count in a block pointer field of a production file inode and a reference count in metadata of a data block to indicate that production file inode has exclusive ownership of the data block.

As shown in FIG. 2, for example, a production file inode 61 includes a pointer field 62 containing a delegated reference count 63 and a block pointer 62 pointing to a first file system data block 60. The block pointer 64 is a file system block number of the first data block 60. The first data block 60 has associated block metadata 65 including a reference count 66. The metadata 65 of the first data block, for example, is organized as table separate from the first data block 67 and indexed by the block number of the first data block 67.

In the example of FIG. 2, the delegated reference count 63 is associated with the parent-child block relationship indicated by the block pointer 64 by storing the delegated reference count in one or more bytes of the block pointer field 62. The delegated reference count 63, however, could be associated with the parent-child block relationship in other ways. For example, the delegated reference count could be stored in a metadata table of the production file inode.

In the example of FIG. 2, the delegated reference count 63 has an initial full-weight value of 1,000, and the reference count 66 in the metadata 65 of the first data block 60 also has an initial full-weight value of 1,000. For compatibility with a conventional data de-duplication facility, the initial full-weight value of 1,000 should be understood as representing a full ownership interest (i.e., a 100% ownership interest) of the file system data block, corresponding to a value of one count in the conventional usage of a reference count in a data de-duplication facility. The snapshot copy facility delegates a partial ownership interest to a snapshot copy when sharing occurs between a snapshot copy and a production file. The data de-duplication facility increments the reference count in the block metadata by a full-weight value when the data de-duplication facility causes sharing of the data block to occur within the same file or between entirely unrelated files.

Figure 3:
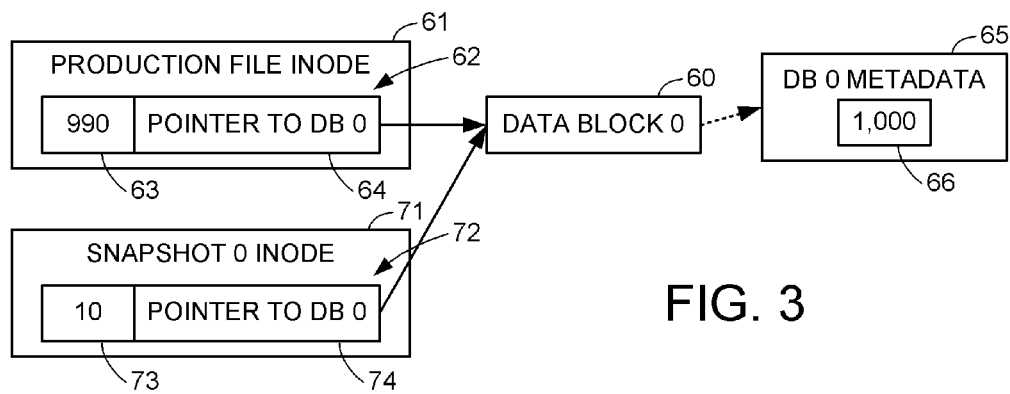
FIG. 3 is a block diagram showing the sharing of the data block when a first snapshot copy has just been made of the production file introduced in FIG. 2.

As shown in FIG. 3, when the snapshot copy facility creates a first snapshot copy of the production file, the snapshot copy facility allocates an inode 71 for the snapshot copy, and copies the content of the production file inode 61 into the snapshot copy inode 71. Then the snapshot copy facility decrements the delegated reference count 63 in the block pointer field 62 of the production file inode 61 by a partial-weight value of 10, and sets the delegated reference count 73 in the block pointer field 72 of the snapshot inode 71 to the same partial-weight value of 10.

Although in general a partial-weight value is simply smaller than a full-weight value, in most cases it is desirable for the ratio of the full-weight value to the partial-weight value to be greater than the maximum number of snapshot copies of a production file. Otherwise a background routine could be used to increment the delegated reference counts in the production file inode or indirect blocks and the reference counts of the production file child blocks when the delegated reference counts in the production file inode or indirect blocks would become relatively small. For some applications, a relatively small partial weight in relationship to a limited number of snapshot copies would also permit identification of child blocks exclusively owned or shared only among snapshot files, permitting a rapid delete of all snapshot copies simply by scanning for file system blocks having a reference count value below a certain threshold, and de-allocating all such blocks.

Figure 4:
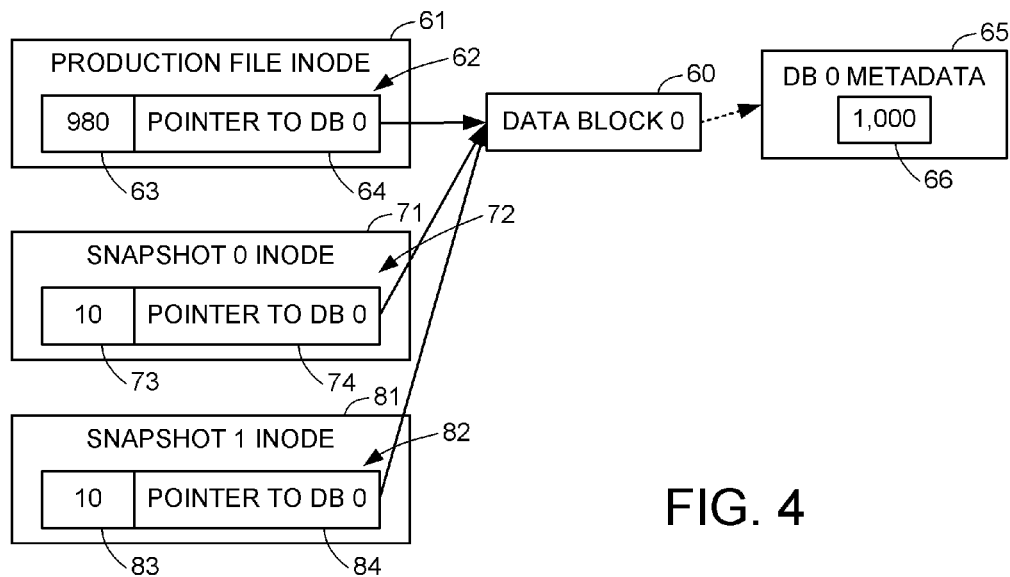
FIG. 4 is a block diagram showing the sharing of the data block when a second snapshot copy is made of the production file introduced in FIG. 2.

As shown in FIG. 4, when the snapshot copy facility creates a second snapshot copy of the production file, the snapshot copy facility allocates an inode 81 for the second snapshot copy, and copies the content of the production file inode 61 into the second snapshot copy inode 81. Then the snapshot copy facility decrements the delegated reference count 63 in the block pointer field 62 of the production file inode 61 by a partial-weight value of 10, and sets the delegated reference count 83 in the block pointer field 82 of the second snapshot inode 81 to the same partial-weight value of 10.

Figure 5:
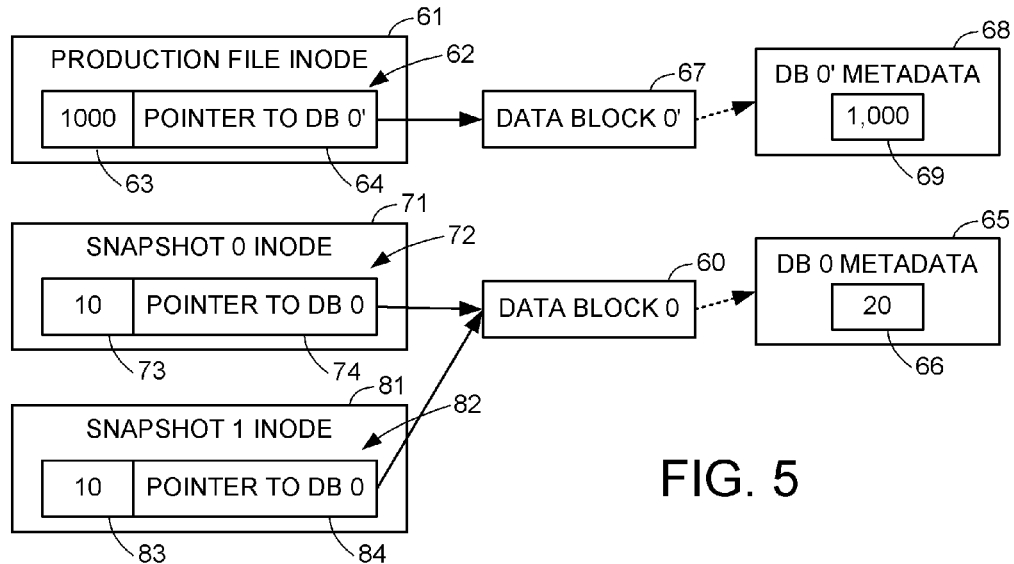
FIG. 5 is a block diagram showing the versions of the production file when new data is written to the data block of the production file.

As shown in FIG. 5, when the snapshot copy facility writes to the first data block of the production file, it allocates a new data block 67 and writes to the new data block and sets the reference count 69 in the metadata 68 of the new data block to a full-weight value of 1,000, and decrements the reference count 66 in the metadata 65 of the old data block 60 by the delegated reference count 63 associated with the pointer to the old data block 60 (resulting in a decremented reference count of 20), and changes the block pointer 64 to point to the new data block 67, and resets the delegated reference count 63 to a full-weight value of 1,000.

Figure 6:
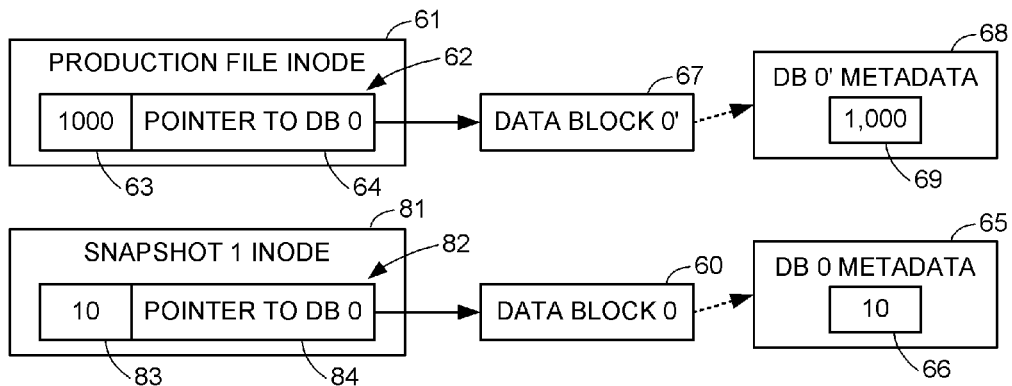
FIG. 6 is a block diagram showing the versions of the production file when the first snapshot copy has been deleted.

As shown in FIG. 6, when the first snapshot copy has been deleted, the first snapshot copy inode (71 in FIG. 5) has been deallocated, and the reference count 66 in the metadata 65 of the data block 60 has been decremented by the delegated reference count (73 in FIG. 5) associated with the block pointer (74 in FIG. 5) in the first snapshot copy inode (71 in FIG. 5). Thus, in FIG. 6, the delegated reference count 83 in the block pointer field 82 in second snapshot copy inode 81 is now equal to the reference count 66 in the metadata 65 of the data block 60, indicating that the data block 60 is now exclusively owned by the second snapshot copy mode 81.

Figure 7:
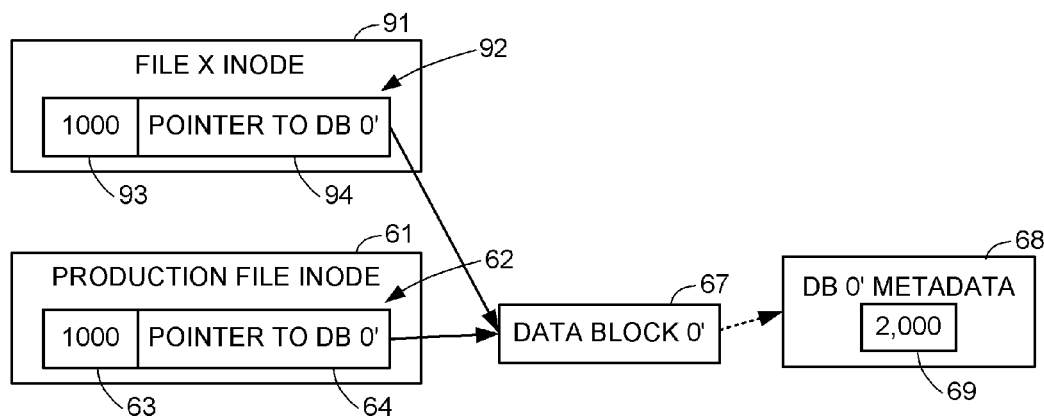
FIG. 7 is a block diagram showing the reference counts when a data de-duplication facility shares a block of the production file with an otherwise unrelated file.

As shown in FIG. 7, when the data de-duplication facility finds that a File X includes a data block having the same content as the data block 67 of the production file, the data de-duplication facility sets a block pointer 94 in the inode 91 of the File X to point to the data block 67, and sets a delegated reference count 93 in the block pointer field 92 to indicate a full-weight value of 1,000, and increments the reference count 69 in the metadata 68 of the data block 67 by the full-weight value. Thus, the reference count 69 has a value of 2,000.

In general, the delegated reference count method as shown in FIGS. 2-7 results in the reference count in the metadata of a child block being equal to the sum of all the delegated reference counts associated with all of the child's parent blocks in the file system block hierarchy. The block sharing caused by data de-duplication increments the reference count in the metadata of a child block by a full weight. The block sharing caused by creation of snapshot copies does not change the reference count in the metadata of a child block, but the deletion of the production file or a snapshot copy will decrement the reference count in the metadata of a child block by a full weight or a partial weight depending on whether or not the deleted version did not share the child block with a related version or did share the child block with a related version.

Figure 8:
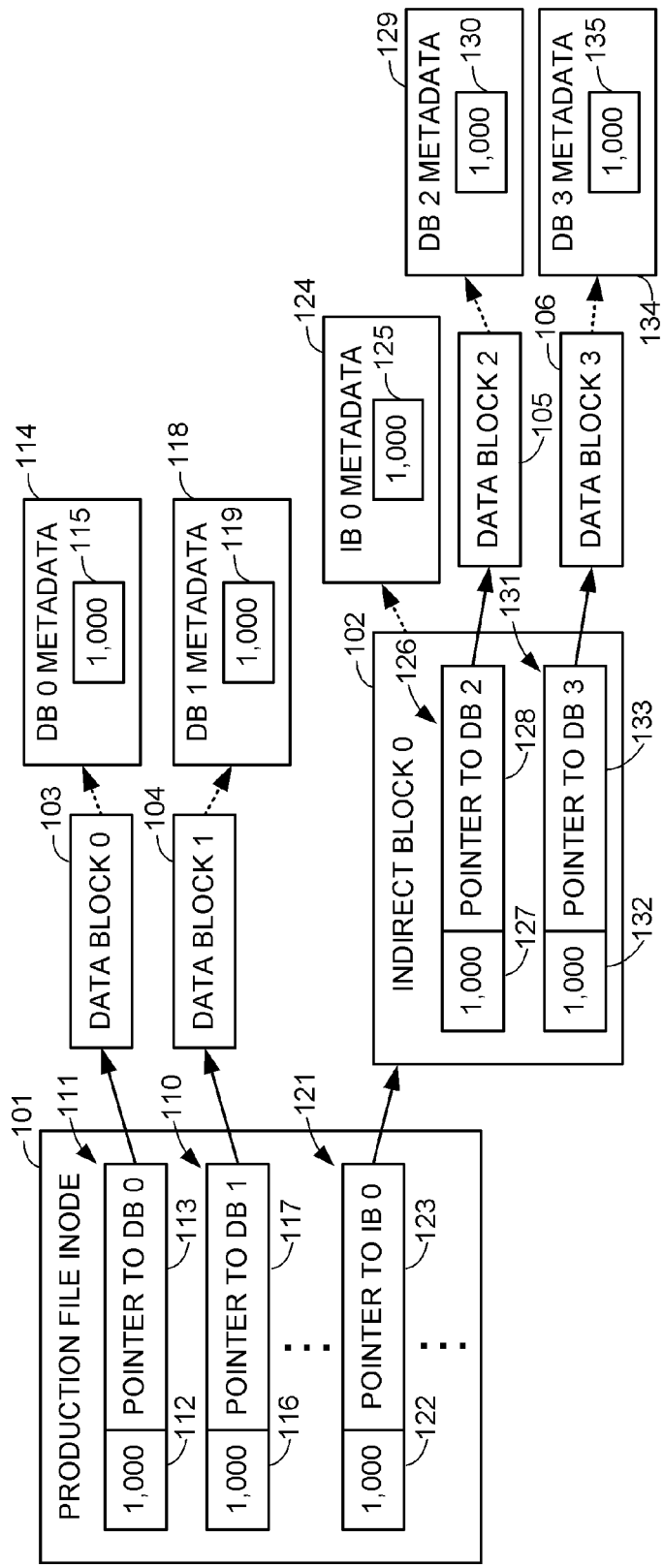
FIG. 8 is a block diagram of a production file including an indirect block.

FIG. 8 shows an example of a more general case in which a production file includes an indirect block 102 in addition to the production file inode 101 and at least four file system data blocks 103, 104, 105, and 106. A first block pointer field 111 in the production file inode 101 includes a delegated reference count 112 having a full-weight value of 1,000, and the block pointer field 111 also includes a pointer 113 to a first data block 103. The first data block 103 has metadata 114 including a reference count 115 also having a full-weight value of 1,000. A second block pointer field 110 in the production file inode 101 includes a delegated reference count 116 having a full-weight value of 1,000, and the block pointer field 110 also includes a pointer 117 to a second data block 104. The second data block 104 has metadata 118 including a reference count 119 also having a full-weight value of 1,000.

The production file inode 101 includes another block pointer field 121 including a reference count 122 having a full-weight value of 1,000, and the bock pointer field 121 also includes a pointer 123 to an indirect block 102. The indirect block 102 has metadata 124 including a reference count 125 having a full-weight value of 1,000. The indirect block 102 has a first block pointer field 126 including a delegated reference count 127 having a full-weight value of 1,000, and the first block pointer field 126 also includes a pointer 128 to a third data block 105. The third data block 105 has metadata 129 including a reference count 130 having a full-weight value of 1,000. The indirect block 102 has a second block pointer field 131 including a delegated reference count 132 having a full-weight value of 1,000, and the second block pointer field 131 also includes a pointer 133 to a fourth data block 106. The fourth data block 106 has metadata 134 including a reference count 135 having a full-weight value of 1,000.

Figure 9:
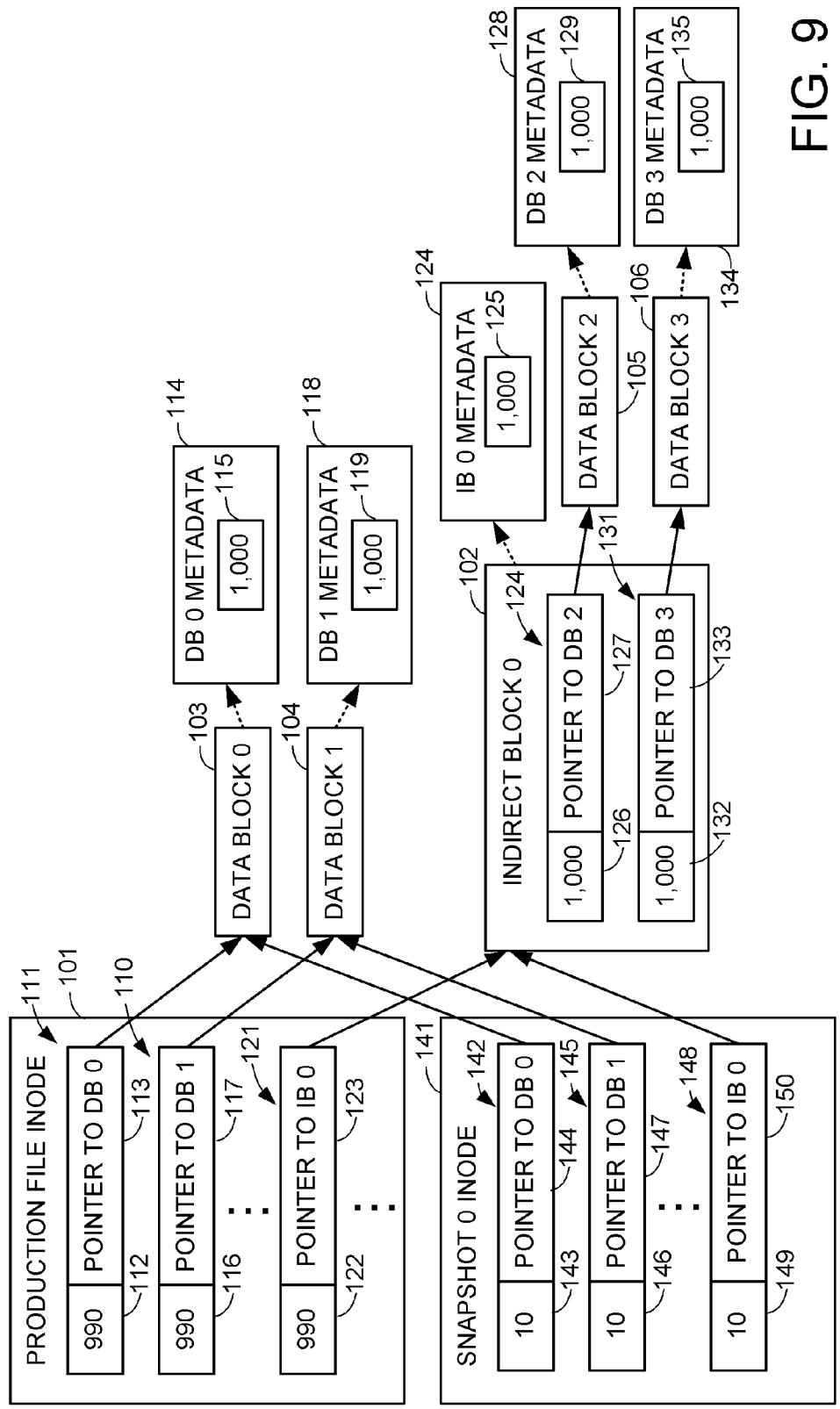
FIG. 9 is a block diagram showing the sharing of the indirect block and data blocks when a first snapshot copy has just been made of the production file of FIG. 8.

FIG. 9 sows that when a snapshot copy is made of the production file (as shown in FIG. 8), an inode 141 is allocated for the snapshot copy, and content of the production file inode 101 is copied into the snapshot copy inode 141, so that the child blocks 102, 103, and 104 of the production file inode 101 also become child blocks of the snapshot copy inode 141. Then the delegated reference counts 112, 116, 122 in the production file inode 101 are each decremented by a partial-weight value of 10, and the delegated reference counts 143, 146, 149 in the snapshot copy inode 141 are set to the partial-weight value of 10.

Figure 10:
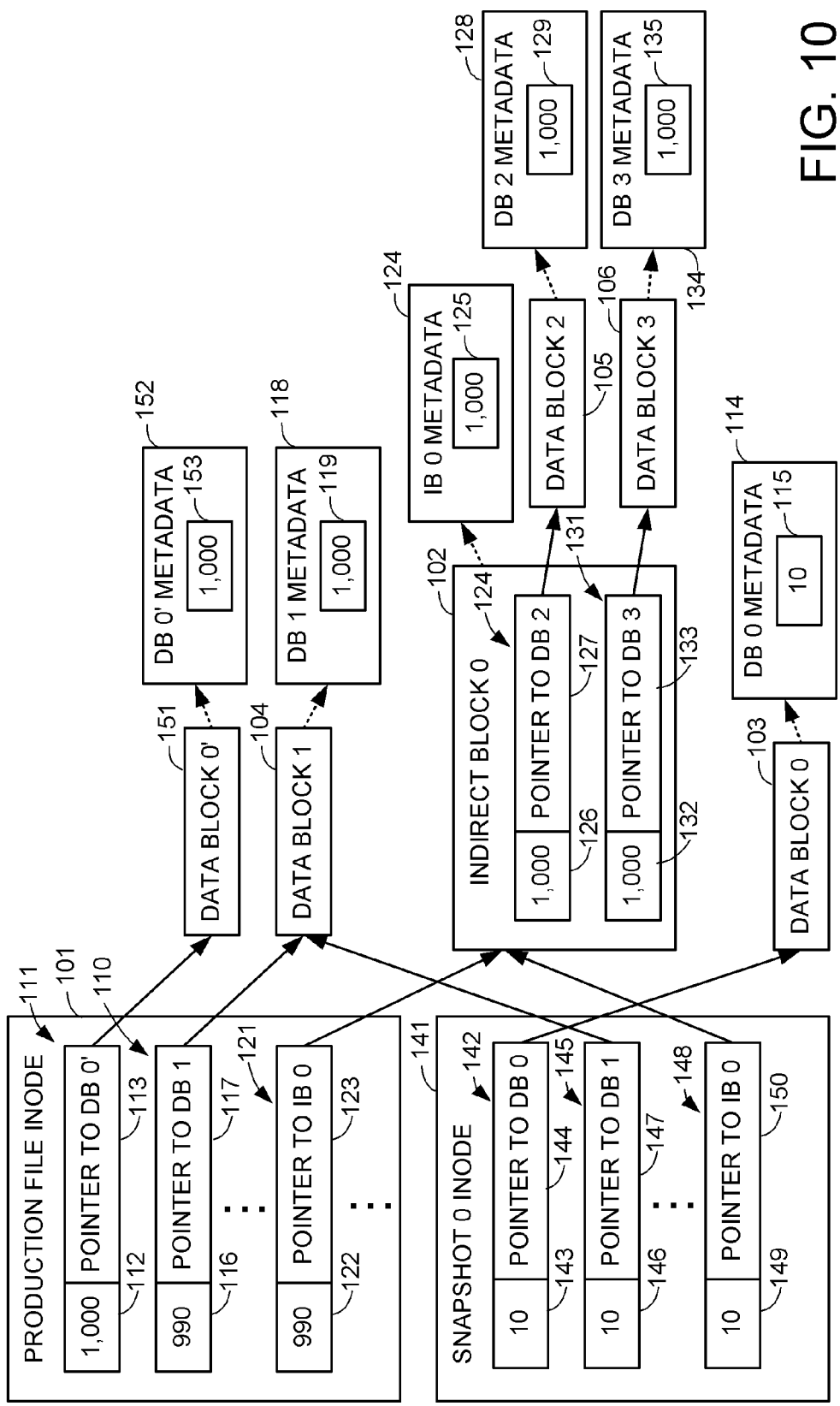
FIG. 10 is a block diagram showing the sharing of the file system blocks between the versions of FIG. 9 when new data is written to a data block pointed to by the inodes of the versions.

FIG. 10 shows that when new data is written to the production file at an offset in the production file encompassed by the first data block (103 in FIG. 9), a new data block 151 is allocated and the new data is written to this new data block. The new data block 151 has metadata 152 including a reference count 153 set to a full-weight value of 1,000. In addition, the reference count 115 in the metadata 114 of the first data block 103 is decremented by the value of the delegated reference count 112 in the pointer field 111 in the production file inode 101, because the production file inode 101 is relinquishing its ownership share of the first data block 103. Then, in the first pointer field 111 in the production file inode 101, the delegated reference count 112 is set to a full-weight value of 1,000, and the pointer 113 is changed to point to the new data block 151. Consequently, the first data block 103 is no longer shared between the production file and the snapshot copy. The first data block 103 has become exclusively owned by the snapshot inode 141, as indicated by equality between the delegated reference count 143 in the snapshot inode 141 and the reference count 115 in the metadata 114 of the first data block 103.

In practice, the data processor (33 in FIG. 1) of the file server performs the write operation of FIG. 10 for a network client by a six step sequence of reads or writes in the file server. First, the data processor reads the production file inode 101. Second, the data processor reads the metadata 114 of the first data block 103, in order to compare the delegated reference count 112 in the pointer field of the production file inode 101 to the reference count 115 in the metadata of the first data block. Third, the data processor reads the metadata 152 of the newly allocated data block 151. Fourth, the data processor modifies and writes the metadata 114 of the first data block and the metadata 152 of the newly allocated data block (while logging the metadata transaction to the file system transaction log 56 in FIG. 1). Fifth, the data processor writes data to the newly allocated data block 151, by writing out-of-band to buffer cache memory of the data processor. Sixth, the data processor modifies and writes the metadata of the production file inode 101 (while logging the metadata transaction to the file system transaction log 56 in FIG. 1).

Figure 11:
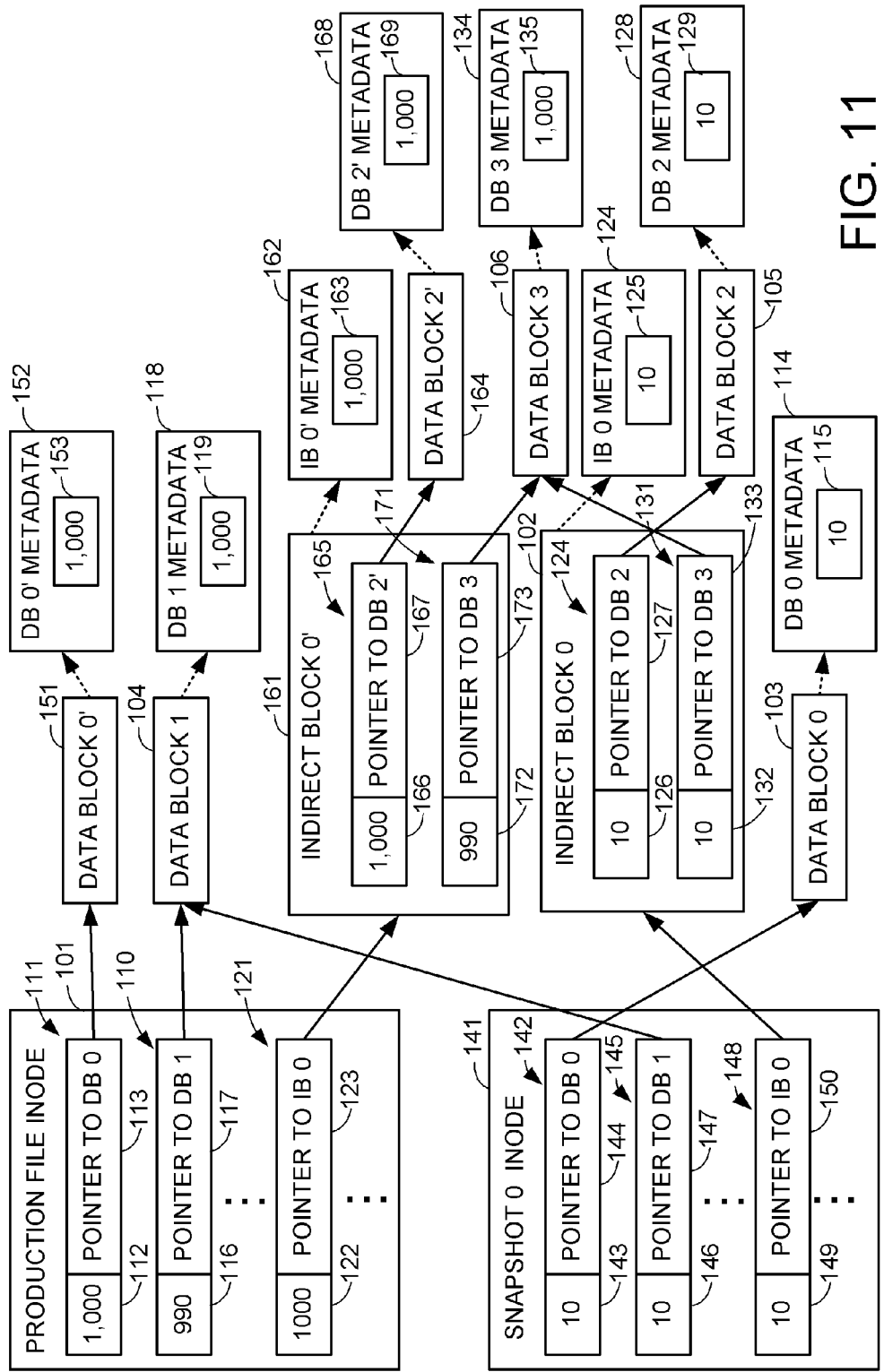
FIG. 11 is a block diagram showing the sharing of the file system blocks between the versions of FIG. 9 when new data is written to a data block pointed to by an indirect block shared between the versions.

FIG. 11 shows that when new data is written to an offset in the production file encompassing the third data block (105 in FIG. 10), the indirect block 102 is duplicated or "split" so that it becomes possible for a new data block 164 to be allocated to the production file to receive the new data. A new indirect block 161 is allocated to the production file, a reference count 163 in the metadata 162 of the new indirect block 161 is set to a full-weight value of 1,000, the contents of the old indirect block 102 are copied to the new indirect block 161, the delegated reference counts 126, 132 in the old indirect block 102 are set to a partial-weight value of 10, and the delegated reference counts in the new indirect block 161 are set to a full-weight value decremented by the partial-weight value, equal to a net value of 990. The reference count 125 in the metadata 124 of the old indirect block 102 is decremented by the value of the delegated reference count 122 in the block pointer field 121 in the production inode 101. Then the delegated reference count 122 is set to a full-weight value of 1,000, and the pointer 123 is changed to point to the new indirect block 161. Consequently, the old indirect block 102 is no longer shared between the production file and the snapshot copy. The old indirect block 102 has become exclusively owned by the snapshot copy inode 141. Then a new data block 164 is allocated to receive the new data, and a reference count 169 is set to a full-weight value of 1,000 in the metadata 168 of the new data block. Then the reference count 129 in the metadata 128 of the old data block 105 is decremented by the value of the delegated reference count 166 in the pointer field 165 of the new indirect block 161. Then the delegated reference count 166 in the pointer field 165 of the new indirect block 161 is set to a full-weight value of 1,000, and the pointer 167 is changed to point to the new data block 164. Consequently, the third data block 105 is no longer shared between the production file and the snapshot copy. The third data block 105 has become exclusively owned by the indirect block 102, as indicated by equality between the delegated reference count 126 in the indirect block 102 and the reference count 129 in the metadata 128 of the third data block.

To delete the snapshot copy from the block hierarchy in FIG. 11, the block hierarchy is searched in a top-down fashion, starting from the snapshot copy inode 141, for blocks at the bottom of the hierarchy that are exclusively owned by the snapshot copy, and these exclusively-owned blocks are unlinked from the hierarchy and de-allocated in a bottom-up fashion until the snapshot copy inode itself is de-allocated. A block found to be shared at the bottom of the hierarchy is unlinked from its parent block that is exclusively owned by the snapshot copy, and the reference count in the metadata of this child block is decremented by the respective delegated reference count in this parent block. During the top-down search, an equality between the respective delegated reference count in a parent block and the reference count in the metadata of a child block indicates that the child block is exclusively owned by the snapshot copy.

Figure 12:
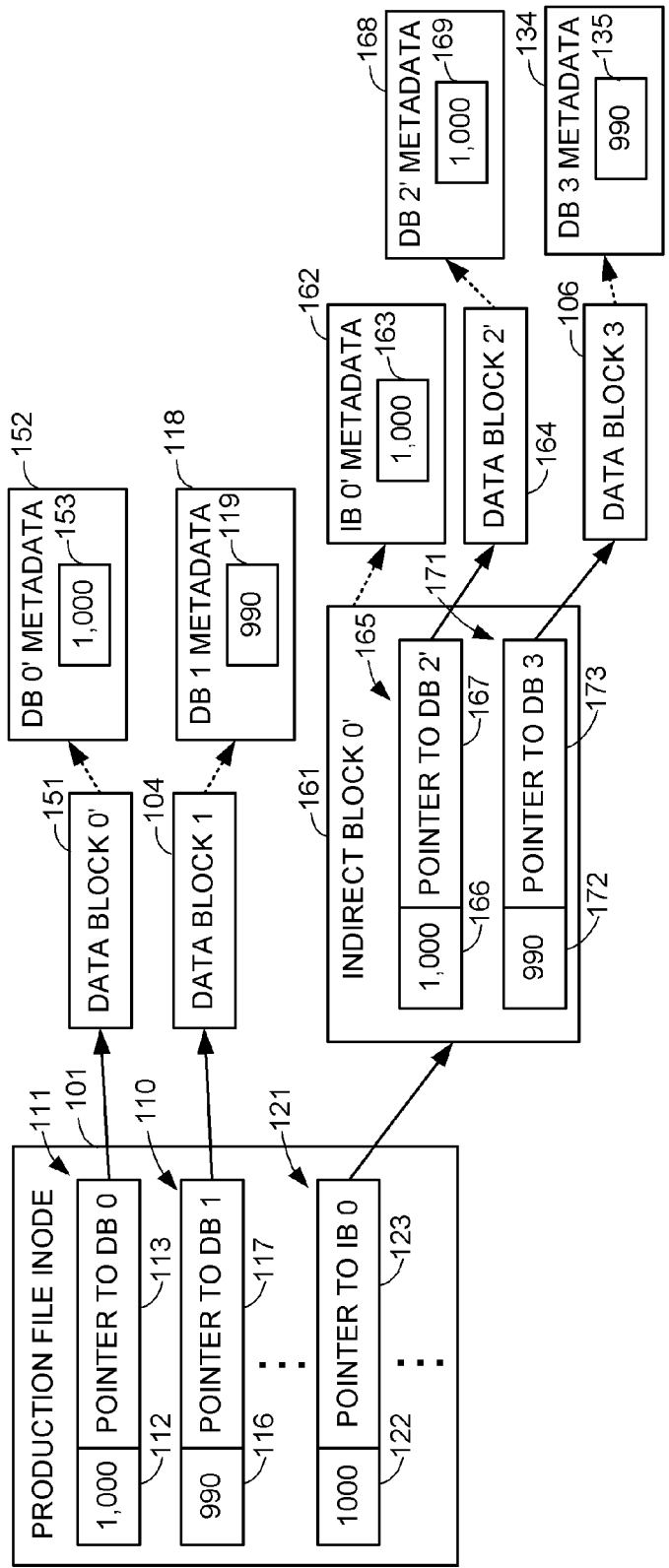
FIG. 12 is a block diagram showing the production file of FIG. 11 when the snapshot copy has been deleted.

Consequently, in the downward search from the snapshot inode 141 during deletion of the snapshot copy, the first data block 103 is identified as exclusively owned by the snapshot copy, so that this first data block is unlinked from the snapshot inode 141 and de-allocated. Then the downward search identifies the second data block 104 as shared, so that this second data block is unlinked from the snapshot inode 141 and its reference count 119 is decremented by 10 resulting in a net value of 990. Then the downward search identifies the third data block 105 as exclusively owned by the snapshot copy, so that this third data block is unlinked from the indirect block 102 and de-allocated. Then the downward search identifies the fourth data block 106 as shared, so that this fourth data block is unlinked from the indirect block 102 and its reference count 135 is decremented by 10 resulting in a net value of 990. Then the indirect block 102 is unlinked from the snapshot inode 141 and de-allocated. Then the snapshot inode 141 is de-allocated. FIG. 12 shows the resulting organization of the blocks in the production file once the snapshot copy has been deleted.

Figure 13:
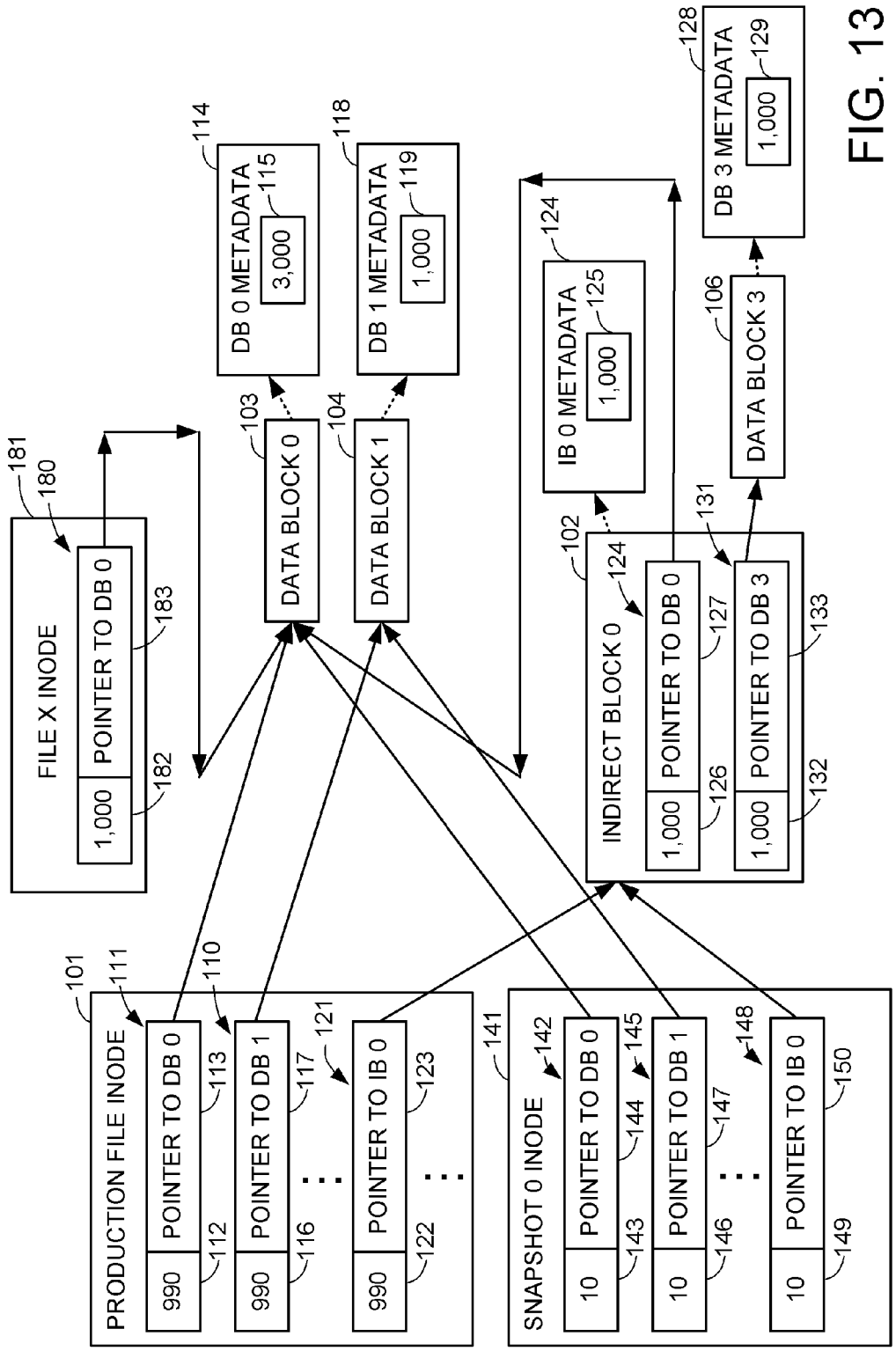
FIG. 13 is a block diagram showing the production file and snapshot copy of FIG. 9 when a data de-duplication facility has caused a block of the production file to be shared within the production file and between the production file and an otherwise unrelated file.
Figure 14:
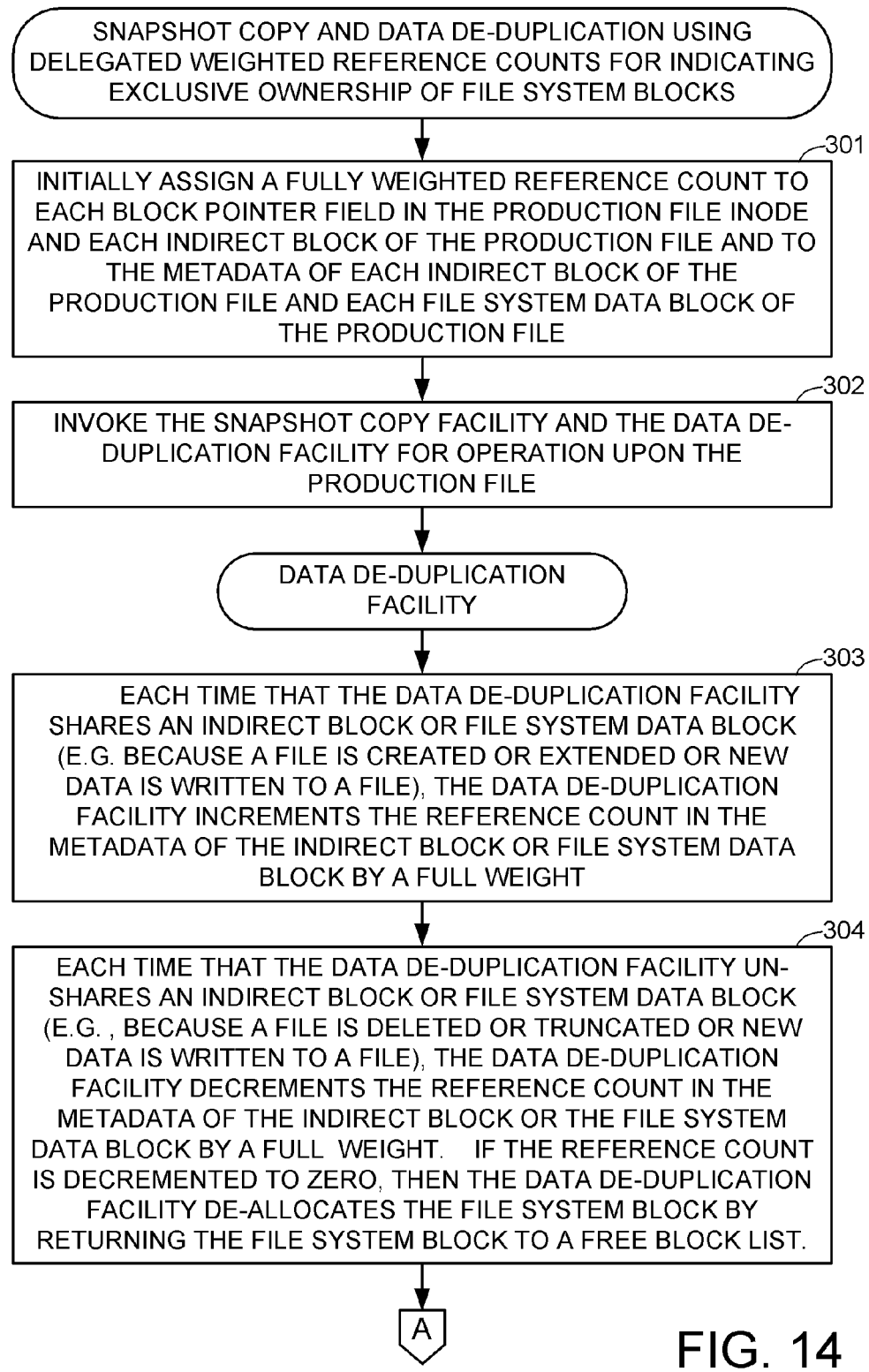
FIGS. 14 to 18 together comprise a flowchart showing a method by which the snapshot copy facility and the data de-duplication facility of FIG. 1 use delegated weighted reference counts for indicating exclusive ownership of file system blocks.

FIG. 13 shows the block hierarchy resulting from data de-duplication upon the block hierarchy in FIG. 9. The data de-duplication facility has found that the content of the third data block (105 in FIG. 8) is the same as the content of the first data block 103, so that the data de-duplication facility changes the pointer 127 in the indirect block 102 to point to the first data block 103, and the reference count 115 in the metadata 114 is incremented by the value of the delegated reference count 126. The data de-duplication facility has also found that the content of a data block in an otherwise unrelated file named "File X" is the same as the content of the first data block 103, so that the data de-duplication facility changes the pointer 183 in the File X inode 181 to point to the first data block 103, and increments the reference count 115 in the metadata 114 of the first data block 103 by 1,000, the full-weight value in the delegated reference count 182 in the pointer field 180 in the File X inode 181.

FIGS. 14 to 18 further show the preferred method by which the snapshot copy facility and the data de-duplication facility of FIG. 1 use delegated weighted reference counts for indicating exclusive ownership of file system blocks. In a first step 301 of FIG. 14, when a production file does not yet share data blocks or indirect blocks with another file, a fully weighted reference count is initially assigned to each block pointer field in the production file inode and each indirect block of the production file and to the metadata of each indirect block of the production file and each file system data block of the production file. Next, in step 302, the snapshot copy facility is invoked for operation upon the production file, and the data de-duplication facility is also invoked for operation upon the production file.

In step 303, each time that the data de-duplication facility causes an indirect block or file system data block to become shared with another inode or indirect block, for example because a file is created or extended or new data is written to a file, the data de-duplication facility increments the reference count in the metadata of the file system data block by a full weight. In step 304, each time that the data de-duplication causes an indirect block or a file system data block to be no longer shared with another inode or indirect block, for example because a file is deleted or truncated or new data is written to a file, the data de-duplication facility decrements the reference count in the metadata of the indirect block or file system data block by a full weight. If the data de-duplication facility decrements the reference count to zero, then the data de-duplication facility de-allocates the indirect block or file system data block by returning the indirect block or file system data block to a free block list.

Figure 15:
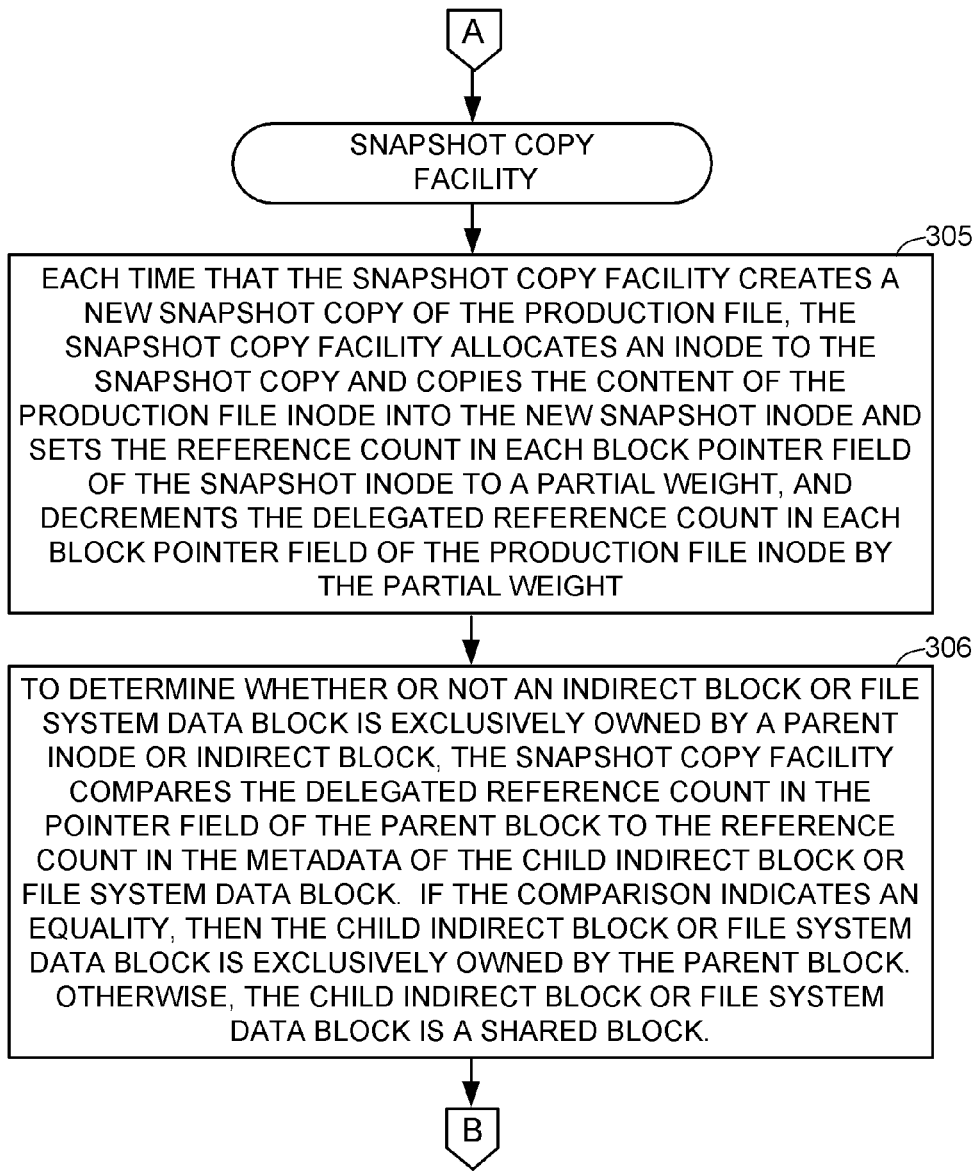

In step 305 of FIG. 15, each time that the snapshot copy facility creates a new snapshot copy of the production file, the snapshot copy facility allocates an inode to the snapshot copy and copies the content of the production file inode into the new snapshot inode and sets the delegated reference count in each block pointer field of the snapshot inode to a partial weight, and decrements the delegated reference count in each block pointer field of the production file inode by the partial weight. In step 306, to determine whether or not an indirect block or file system data block is exclusively owned by a parent inode or indirect block, the snapshot copy facility compares the delegated reference count in the pointer field of the parent block to the reference count in the metadata of the child indirect block or file system data block. If the comparison indicates equality, then the child indirect block or file system data block is exclusively owned by the parent block. Otherwise, the child indirect block or file system data block is a shared block.

Figure 16:
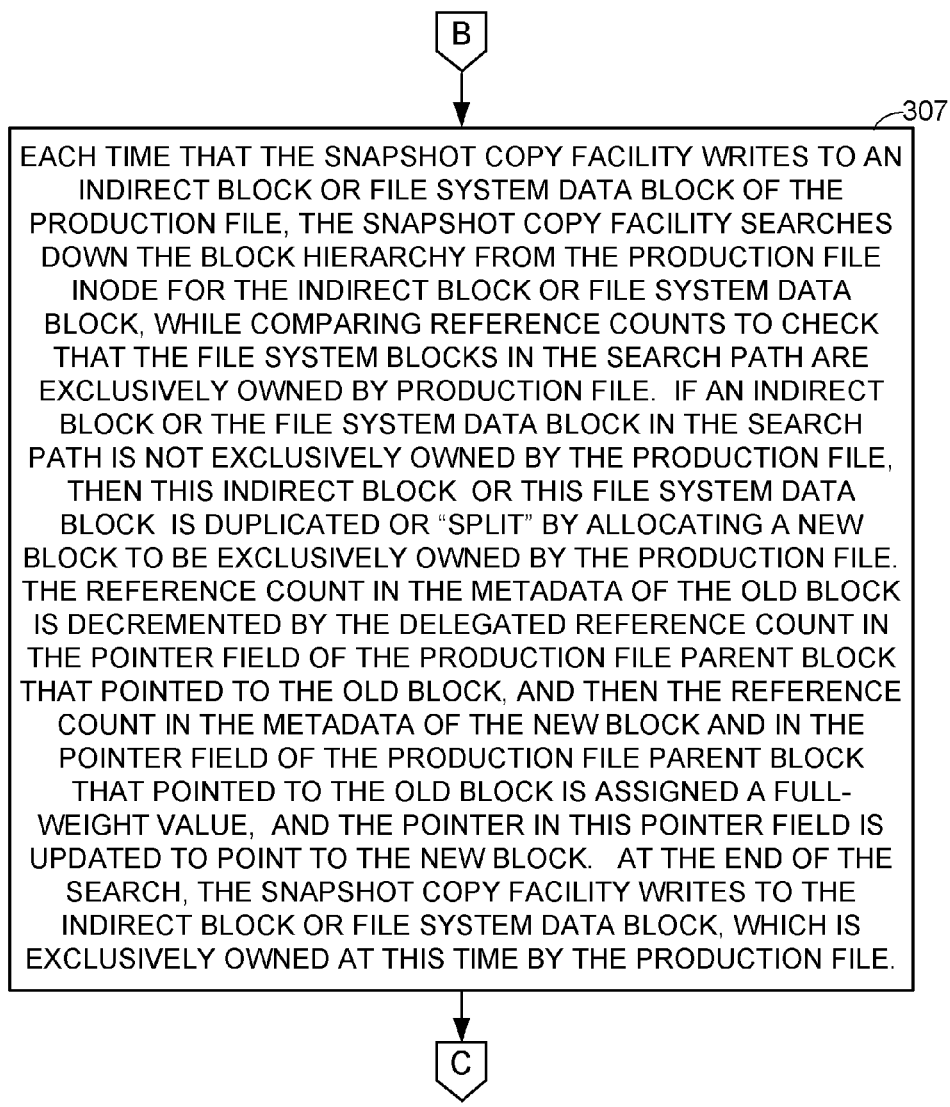

In step 307 of FIG. 16, each time that the snapshot copy facility writes to an indirect block or file system data block of the production file, the snapshot copy facility searches down the block hierarchy from the production file inode for the indirect block or file system data block, while comparing reference counts to check that the file system blocks in the search path are exclusively owned by the owned by the production file inode. If an indirect block or the file system data block is not exclusively owned by the production file inode, then this file system data block is duplicated or "split" by allocating a new block to be exclusively owned by the production file inode. The reference count in the metadata of the old block is decremented by the delegated reference count in the pointer field of the production file parent block that pointed to the old block, and then the reference count in the metadata of the new block and in the pointer field of the production file parent block that pointed to the old block is assigned a full-weight value, and the pointer in this pointer field is updated to point to the new block. At the end of the search, the snapshot copy facility writes to the indirect block or file system data block, which is exclusively owned at this time by the production file inode. A specific example of a program for performing this write operation is described below with reference to FIGS. 19 to 20.

Figure 17:
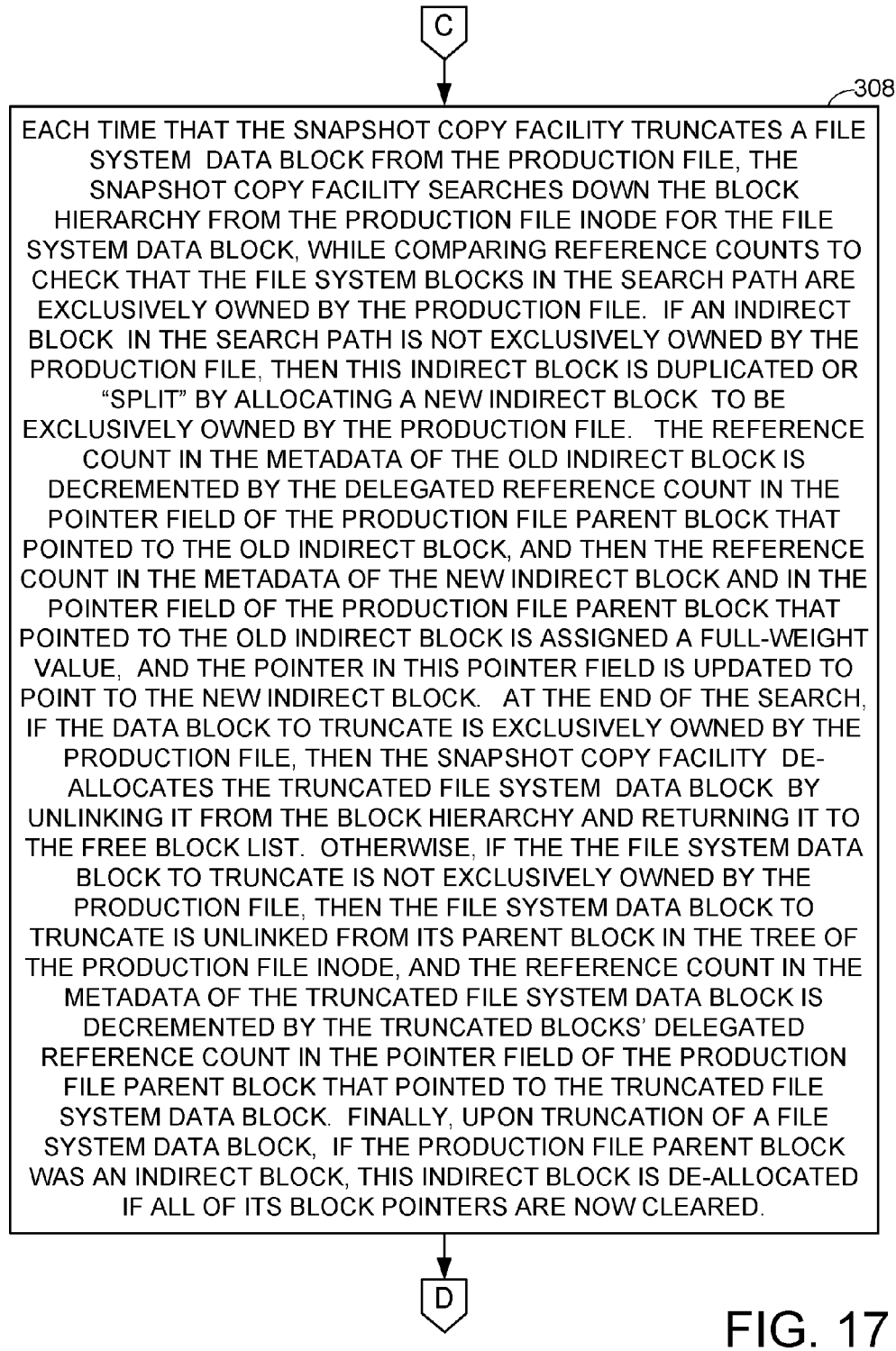

In step 308 of FIG. 17, each time that the snapshot copy facility truncates a file system data block from the production file, the snapshot copy facility searches down the block hierarchy from the production file inode for the file system data block, while comparing reference counts to check that the file system blocks in the search path are exclusively owned by the production file. If an indirect block in the search path is not exclusively owned by the production file, then this indirect block is duplicated or "split" by allocating a new indirect block to be exclusively owned by the production file. The reference count in the metadata of the old indirect block is decremented by the delegated reference count in the pointer field of the of the production file parent block that pointed to the old indirect block, and then the reference count in the metadata of the new indirect block and in the pointer field of the production file parent block that pointed to the old indirect block is assigned a full-weight value, and the pointer in this pointer field is updated to point to the new indirect block. At the end of this search, if the data block to truncate is exclusively owned by the production file, then the snapshot copy facility de-allocates the truncated file system data block by unlinking it from the block hierarchy and returning it to the free block list. Otherwise, if the file system data block to truncate is not exclusively owned by the production file, then the file system data block to truncate is unlinked from its parent block in the tree of the production file inode, and the reference count in the metadata of the truncated file system data block is decremented by the truncated block's delegated reference count in the pointer field of the production file parent block that pointed to the truncated file system data block. Finally, upon truncation of a file system data block, if the production file parent block was an indirect block, this indirect block is de-allocated if all of its block pointers are now cleared.

Figure 18:
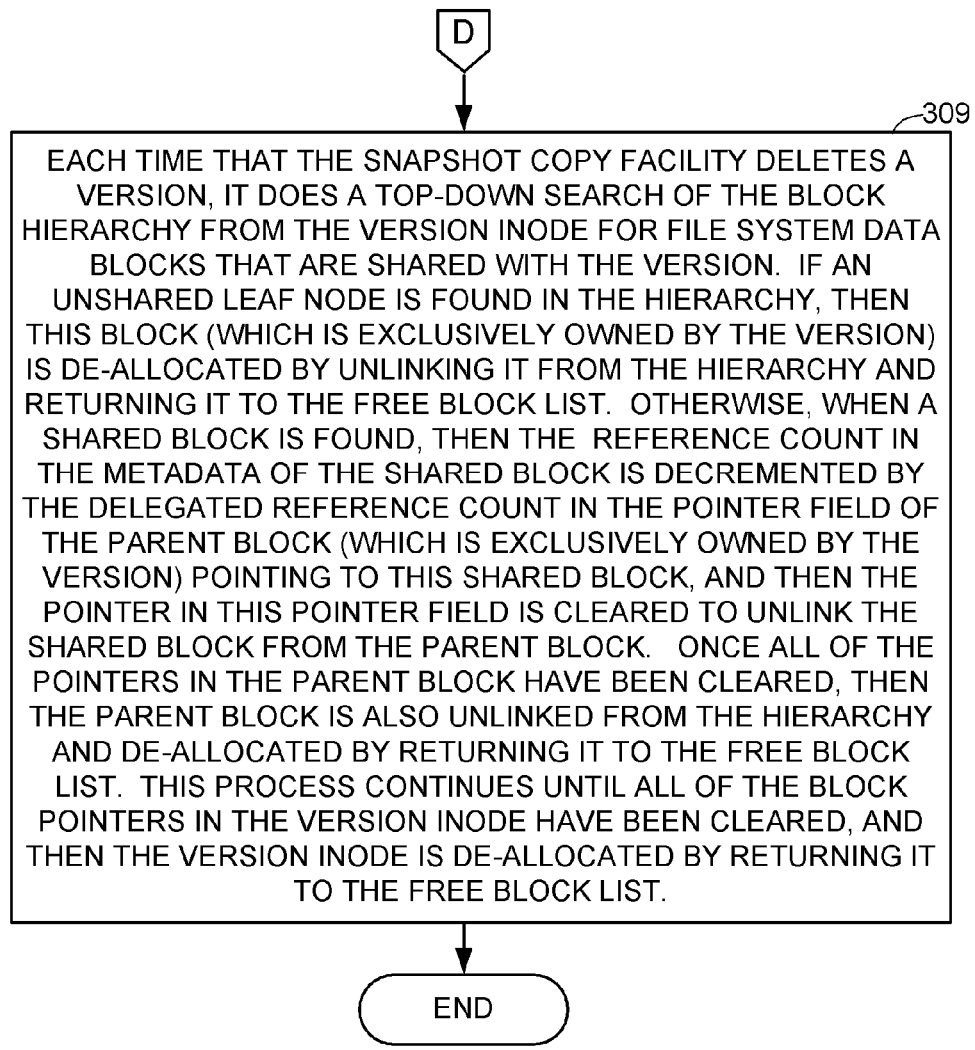

In step 309 of FIG. 18, each time that the snapshot copy facility deletes a version (i.e., a production file or a snapshot copy of the production file), the snapshot copy facility does a top-down search of the block hierarchy from the version inode for the file system data blocks that are shared with the version. If an unshared leaf node is found in the block hierarchy, then this block (which is exclusively owned by the version) is de-allocated by unlinking it from the hierarchy and returning it to the free block list. Otherwise, when a shared block is found, the reference count in the metadata of the shared block is decremented by the delegated reference count in the pointer field of the parent block (which is exclusively owned by the version) pointing to this shared block and then the pointer in this pointer field is cleared to unlink the shared block from the parent block. Once all of the pointers in the parent block have been cleared, the parent block is also unlinked from the block hierarchy and de-allocated by returning the parent block to the free block list. This process continues until all of the block pointers in the version inode have been cleared, and then the version inode is de-allocated by returning it to a free inode list.

Figure 19:
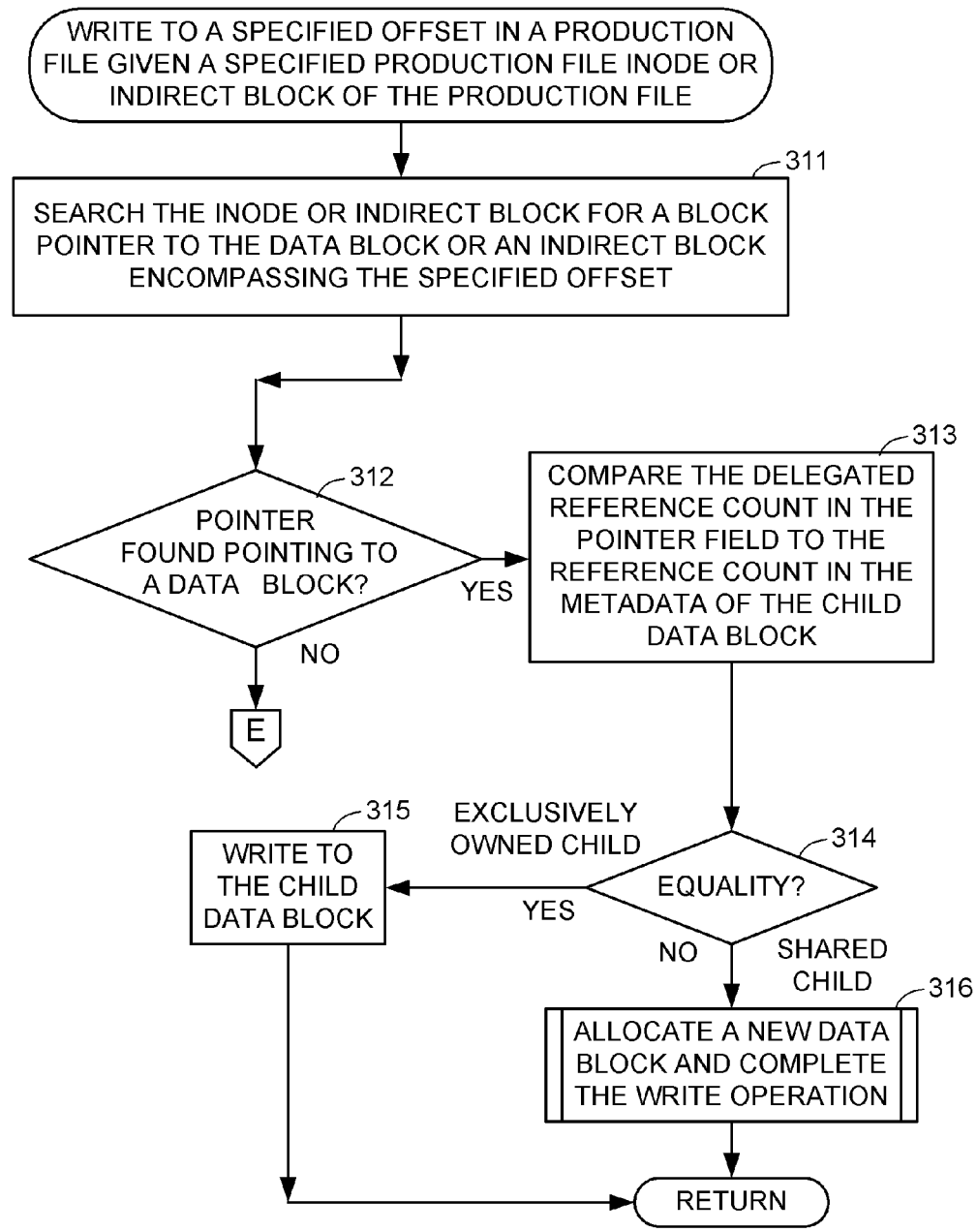
FIGS. 19 and 20 together comprise is a flowchart of a subroutine of the snapshot copy facility of FIG. 1 for writing to a specified offset in a production file given a specified production file inode or indirect block of the production file.
Figure 20:
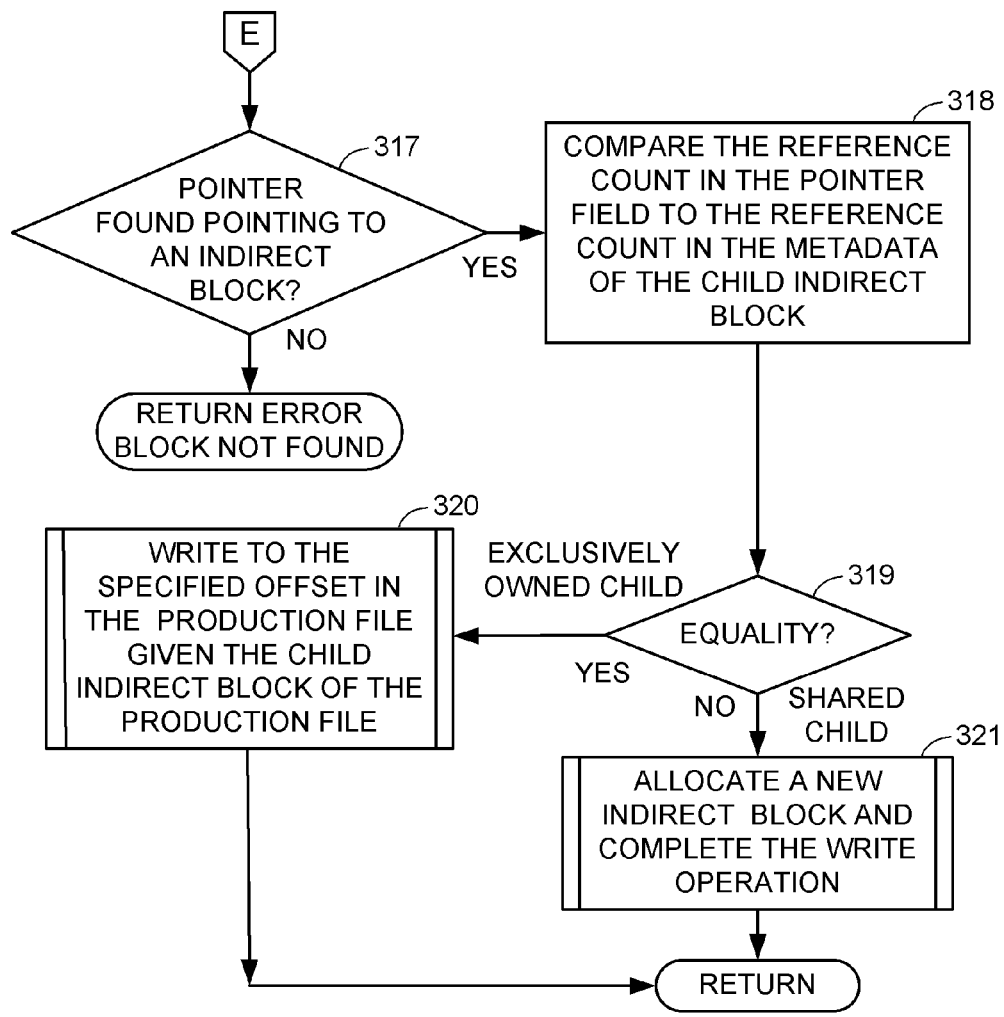

FIGS. 19 and 20 show a flowchart of a subroutine of the snapshot copy facility of FIG. 1 for writing to a specified offset in a production file given a specified production file inode or indirect block of the production file. In a first step 311, the snapshot copy facility searches the inode or indirect block for a block pointer to the data block or an indirect block encompassing the specified offset. In a typical case, an index to the block pointer in the production file inode is directly computed from the specified offset, and an index to the block pointer in an indirect block is directly computed form the specified offset and the result of a similar computation previously performed for the parent block along the search path down from the production file inode. Next, in step 312, if the search in step 311 finds a block pointer pointing to a data block, then execution branches to step 313. In step 313, the snapshot copy facility compares the delegated reference count in the pointer field to the reference count in the metadata of the child data block. In step 314, if the comparison in step 313 indicates equality, then the child data block is exclusively owned by the production file inode or indirect block of the production file. In this case, execution branches to step 315 to write to the child data block, and execution returns.

In step 314, if the comparison in step 313 does not indicate an equality, then execution continues to step 316. In this case, the child data block is a shared data block. In step 316, the snapshot copy facility calls a subroutine (further described below with reference to FIG. 21) that allocates a new data block and completes the write operation, and then execution returns.

In step 312, if the search in step 311 does not find a pointer pointing to a data block, then execution continues to step 317 of FIG. 20. In step 317, if the search in step 311 finds a pointer pointing to an indirect block, then execution branches from step 317 to step 318. In step 318, the snapshot copy facility compares the reference count in the pointer field to the reference count in the metadata of the child indirect block. Execution continues from step 318 to step 319. In step 319, if the comparison in step 318 indicates equality, then execution branches from step 319 to step 320. In this case, the child indirect block is exclusively owned by the parent inode or indirect block in the production file. In step 320, the snapshot copy facility invokes a recursive call to the subroutine beginning in FIG. 19, and then execution returns.

In step 319, if the comparison in step 318 does not indicate an equality, then execution continues from step 319 to step 321. In this case, the child indirect block is a shared block. In step 321, the snapshot copy facility calls a subroutine (described further below with reference to FIG. 22) to allocate a new indirect block and compete the write operation, and then execution returns.

Figure 21:
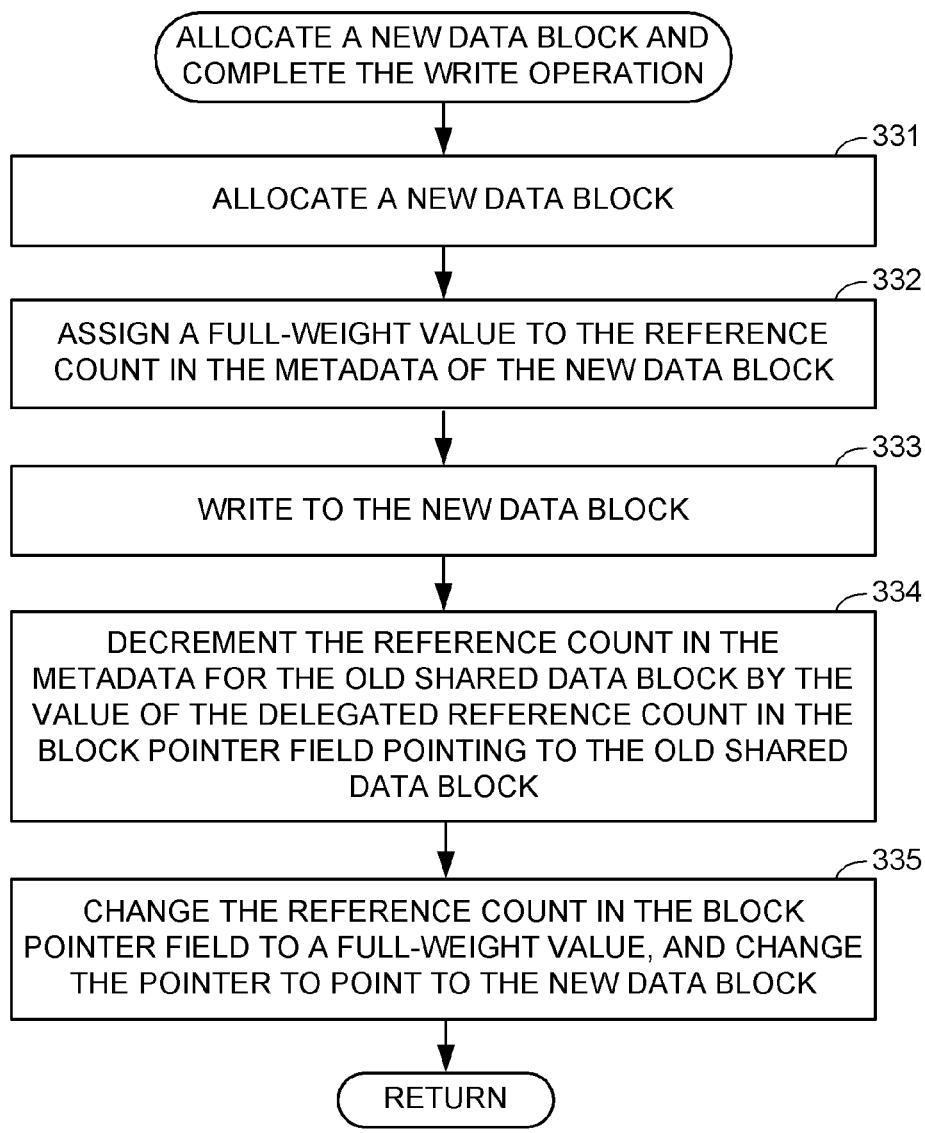
FIG. 21 is a flowchart of a subroutine called in FIG. 19 for allocating a new data block and completing the write operation.

FIG. 21 shows the subroutine called in step 316 of FIG. 19 for allocating a new data block and completing the write operation. In a first step 331, a new data block is allocated. In step 332, the snapshot copy facility assigns a full-weight value to the reference count in the metadata of the new data block. In step 333, the snapshot copy facility writes to the new data block. In step 334, the snapshot copy facility decrements the reference count in the metadata for the old shared data block by value of the delegated reference count in the block pointer field pointing to the old shared data block. Finally, in step 335, the snapshot copy facility changes the delegated reference count in the block pointer field to a full-weight value, and changes the pointer to point to the new data block, and then execution returns.

Figure 22:
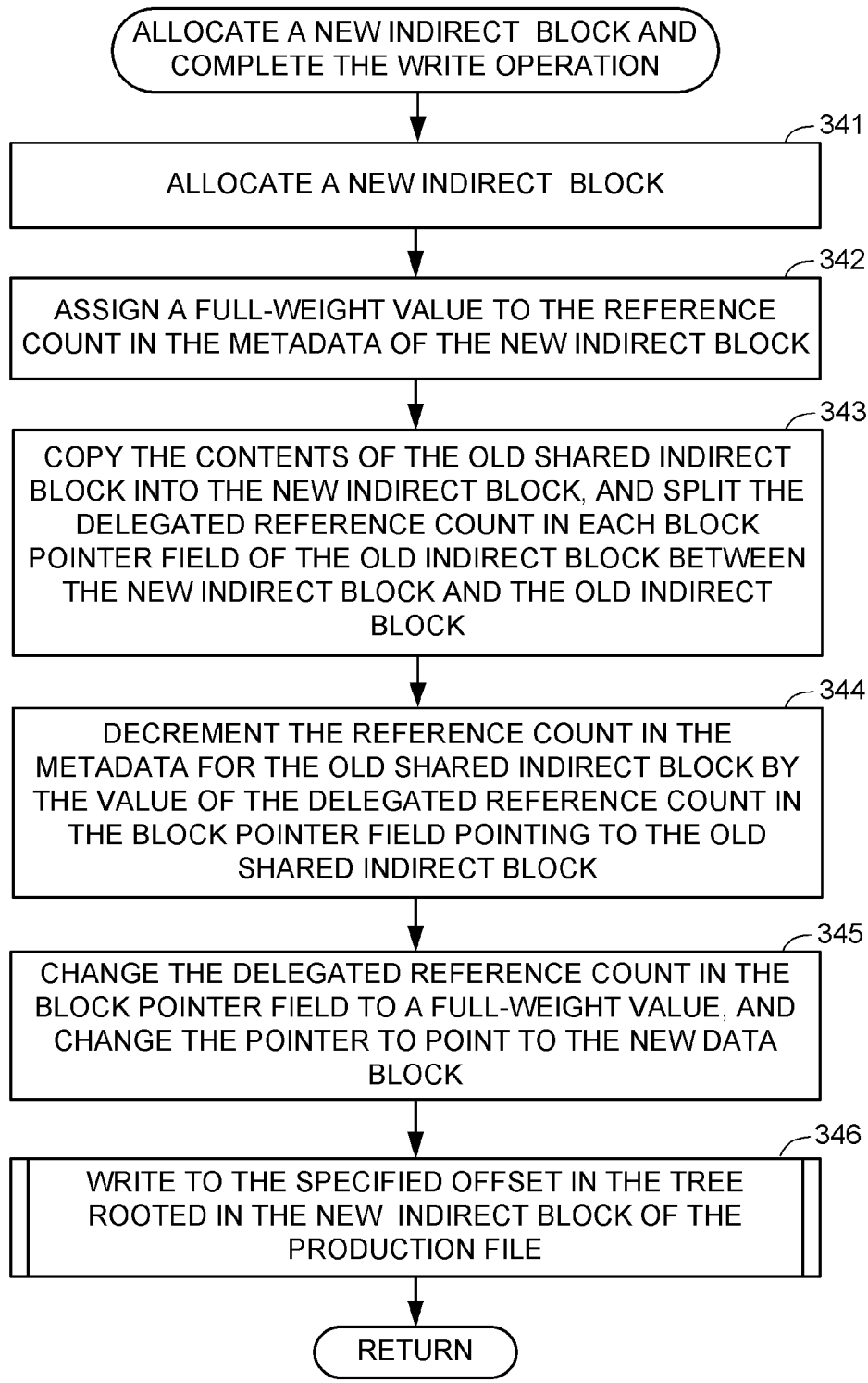
FIG. 22 is a flowchart of a subroutine called in FIG. 20 for allocating a new indirect block and completing the write operation.

FIG. 22 shows a subroutine called in step 321 of FIG. 20 for allocating a new indirect block and completing the write operation. In a first step 341, a new indirect block is allocated. In step 342, the snapshot copy facility assigns a full-weight value to the reference count in the metadata of the new indirect block. In step 343, the snapshot copy facility copies the contents of the old shared indirect block into the new indirect block, and splits the delegated reference count in each block pointer field of the old indirect block between the new indirect block and the old indirect block.

For example, to split the delegated reference count, so long as the delegated reference count in each block pointer field of the old indirect block has a value of at least twice the partial-weight value, the delegated reference count in the corresponding block pointer field of the new indirect block is decremented by the partial-weight value, and the delegated reference count in the block pointer field in the old indirect block is set to the partial-weight value. Otherwise, if the delegated reference count in the block pointer field of the old indirect block does not have a value of at least twice the partial-weight value, then the reference count in the metadata of the pointed-to child block is incremented by the full-weight value minus the partial-weight value, and the delegated reference count in the corresponding block pointer field of the new indirect block is set to the full-weight value minus the partial-weight value.

In a more general case, as described in Bixby et al. U.S. Patent Application Publication 2005/0065986 published Mar. 24, 2005, incorporated herein by reference, it is permitted to convert a read-only snapshot copy to a read-write snapshot copy that may share blocks with the original production file. In this case, a write operation upon the read-write snapshot copy is handled in a way similar to a write operation upon the production file, so that a write to a file offset encompassed by a shared indirect block in the read-write snapshot copy also causes this shared indirect block to be split.

In general, as a result of a split of a shared indirect block, the sum of the delegated reference counts in all of the block pointer fields containing all of the block pointers pointing to a child block will still be equal to the reference count in the metadata of the pointed-to child block. Moreover, the delegated reference count in each pointer field in the old indirect block may be split between the old indirect block and the new indirect block in any one of various ways so that the old indirect block and the new indirect block obtain either the same delegated reference count or different delegated reference counts.

In a typical case, it is desired to split the delegated reference count in each pointer field of the shared indirect block in such as way as to avoid or defer a need to increment the reference count in the metadata of a pointed-to child block when performing another split. For this reason, in a typical case of a split of a shared indirect block when writing to the production file or a read-write snapshot copy, the new indirect block is given much larger delegated reference counts than the old indirect block as a result of the split. This is done with the expectation that the new indirect block rather than the old indirect block is much more likely to be split again, so that it will take a larger number of splits of the new indirect block before the delegated reference counts are reduced to such a low value that it becomes necessary to increment the reference count in the metadata of any pointed-to child blocks of the old indirect block when performing a split.

In addition, a background routine may be used to increment the reference count in the metadata of any pointed-to child blocks before it is likely that delegated reference counts will be reduced to such a low value that it becomes necessary to increment the reference count in the metadata of any pointed-to child blocks when performing a split. For example, the background routine scans the inodes and indirect blocks of production files or read-write snapshot copies for delegated reference counts below a threshold, and upon finding a delegated reference count below the threshold, increments the delegated reference count and the reference count in the metadata of the pointed-to child block by a value sufficient to raise the delegated reference count well above the threshold. For example, the threshold is less than one-quarter of the full-weight value and more than four times the partial-weight value, and upon finding a delegated reference count below the threshold, the background increments the delegated reference count and the reference count in the metadata of the pointed-to child block by a value sufficient to raise the delegated reference count to about one half of the full-weight value.

In step 344, the snapshot copy facility decrements the reference count in the metadata for the old shared indirect block by the value of the delegated reference count in the block pointer field pointing to the old shared data block. In step 345, the snapshot copy facility changes the delegated reference count in the block pointer field to a full-weight value, and changes the pointer to point to the new data block. Finally, in step 346, the snapshot copy facility makes a recursive call to the subroutine of FIG. 19 to write to the specified offset in the tree rooted in the new indirect block of the production file, and then execution returns.

Figure 23:
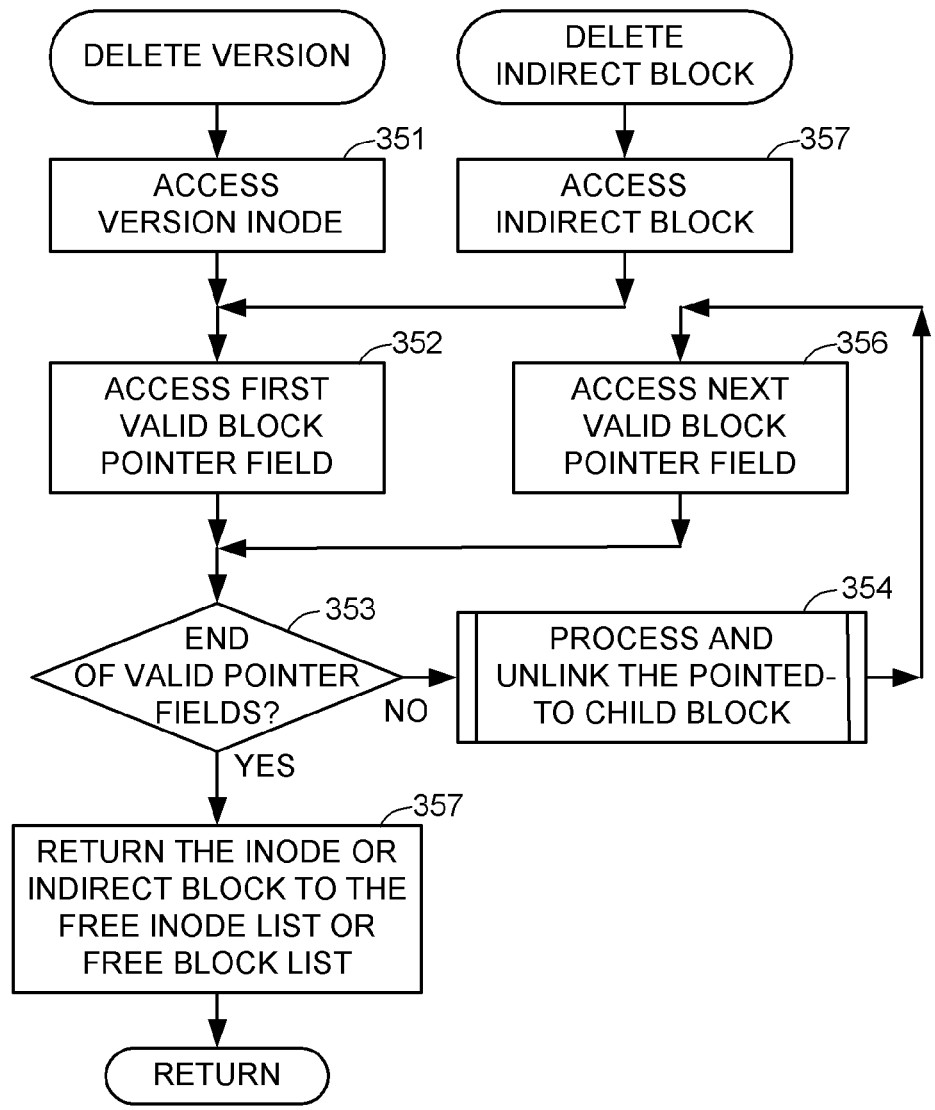
FIG. 23 is a flowchart of a subroutine of the snapshot copy facility of FIG. 1 for deleting a version or deleting an indirect block.

FIG. 23 shows is a flowchart of a subroutine of the snapshot copy facility of FIG. 1 for deleting a version or deleting an indirect block. To delete a version, execution begins in step 351 by accessing the inode of the version. Next, in step 352, the snapshot copy facility accesses the first block pointer field containing a valid pointer. In step 353, unless there are no more valid pointer fields, execution branches to step 354. In step 354, the snapshot copy facility calls a subroutine (described further below with reference to FIG. 24) to process and unlink the pointed-to child block. From step 354, execution continues to step 356 to access the next valid block pointer field. Execution loops from step 356 back to step 353, to process and unlink the next pointed-to child block until the end of the valid pointer fields is reached in step 353, so that execution continues out of the loop to step 357. In step 357, the snapshot copy facility returns the inode or indirect block to the free inode list or the free block list, respectively, and execution returns.

Figure 24:
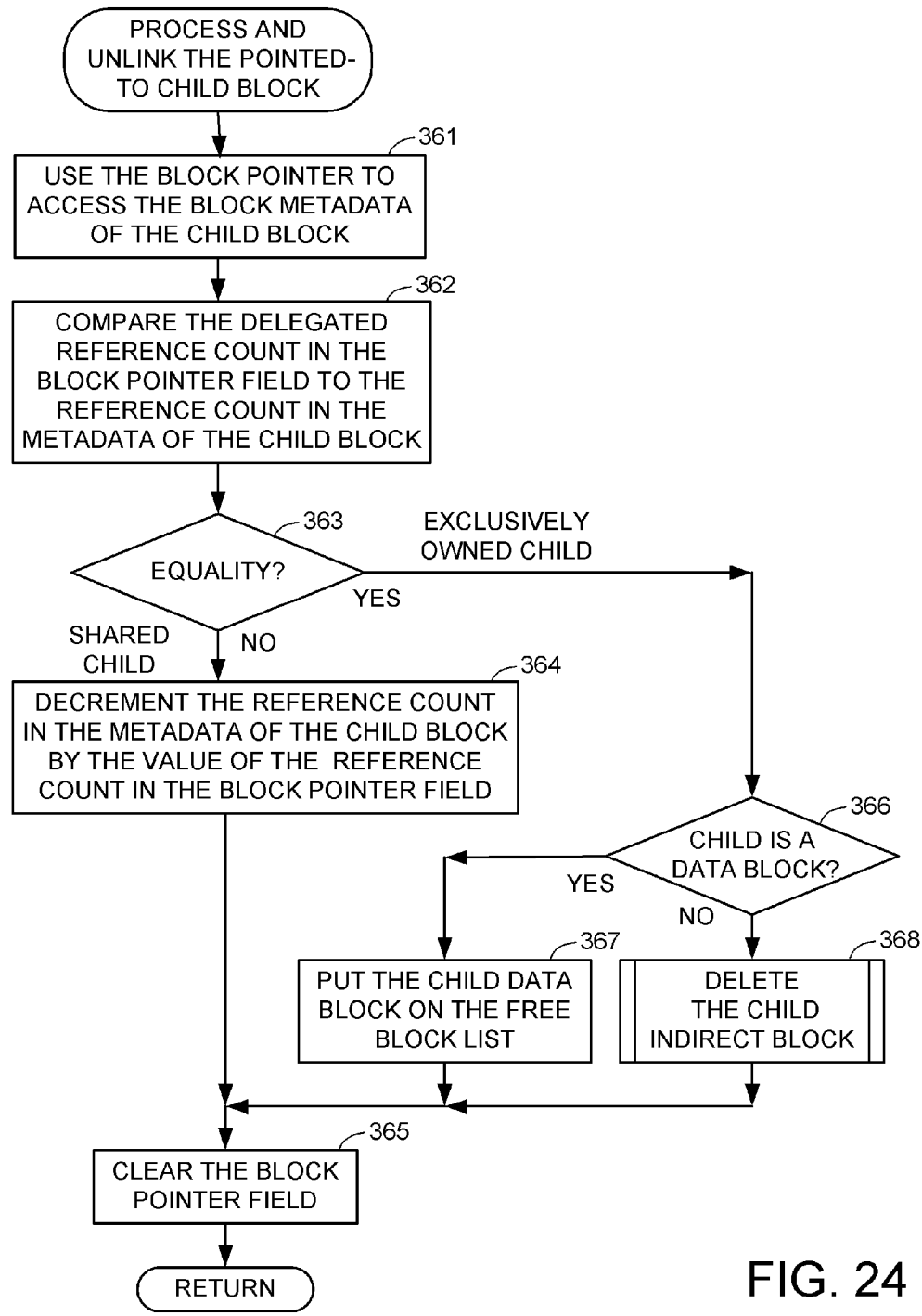
FIG. 24 is a flowchart of a subroutine that is called by the subroutine of FIG. 23.

FIG. 24 shows the subroutine that is called by step 354 of FIG. 23 to process the pointed-to child block and unlink the pointed-to child block. In a first step 361 in FIG. 24, the snapshot copy facility uses the block pointer to access the block metadata of the child block. Then in step 362, the snapshot copy facility compares the delegated reference count in the block pointer field to the reference count in the metadata of the child block. In step 363, if the comparison in step 362 does not indicate an equality, then execution continues to step 364. In this case, the child block is a shared block. In step 364, the snapshot copy facility decrements the reference count in the metadata of the child block by the value of the reference count in the block pointer field. Then, in step 365, the snapshot copy facility clears the block pointer field to unlink the child block from the version inode or the indirect block to be deleted, and execution returns.

In step 363, if the comparison in step 362 indicates equality, then execution branches to step 366. In this case, the child block is exclusively owned by the version inode or indirect block to be deleted. In step 366, if the child block is a data block, execution branches to step 367 to put the child block on the free block list, and then execution continues to step 365 to unlink the child block from the block hierarchy by clearing the block pointer field, and execution returns.

In step 366, if the child block is not a data block, then execution continues to step 368. In this case, the child block is an exclusively owned indirect block. In step 368, the snapshot copy facility makes a recursive call to the subroutine in FIG. 23 to delete the child indirect block. After step 368, execution continues to step 365 to clear the block pointer field, and execution returns.

The delegated reference counts as described above can also be applied to extent-based file systems and file systems that use B-tree indexing instead of indirect blocks. In particular, an extent is a generalization of a file system data block because an extent may comprise a single data block or a plurality of data blocks having contiguous block addresses. Therefore, what has been said above about using a reference count for a file system data block is equally applicable to using a reference count for an extent of data blocks.

In addition, what has been said about using a reference count for an indirect block is applicable to using a reference count for other kinds of intermediate nodes in a hierarchy of file mapping metadata for mapping the logical extent of the file to the data blocks of the file. For example, one may use a B-tree instead of indirect blocks for mapping the logical extent of the file to the block addresses of the data blocks. What has been said above about using a reference count for an indirect block is equally applicable to using a reference count for an intermediate node in a B-tree.

If a file system is based on variable-size extents of data blocks as is desired for efficient snapshot copy and data duplication techniques of extent sharing, then it is desirable to use a B-tree instead of indirect blocks for mapping the logical extent of the file to the block addresses of the extents. The B-tree keeps pointers to the extents sorted by file offset while allowing insertions or substitutions of extents and allowing the search time to grow logarithmically with the number of extents in the file.

Figure 25:
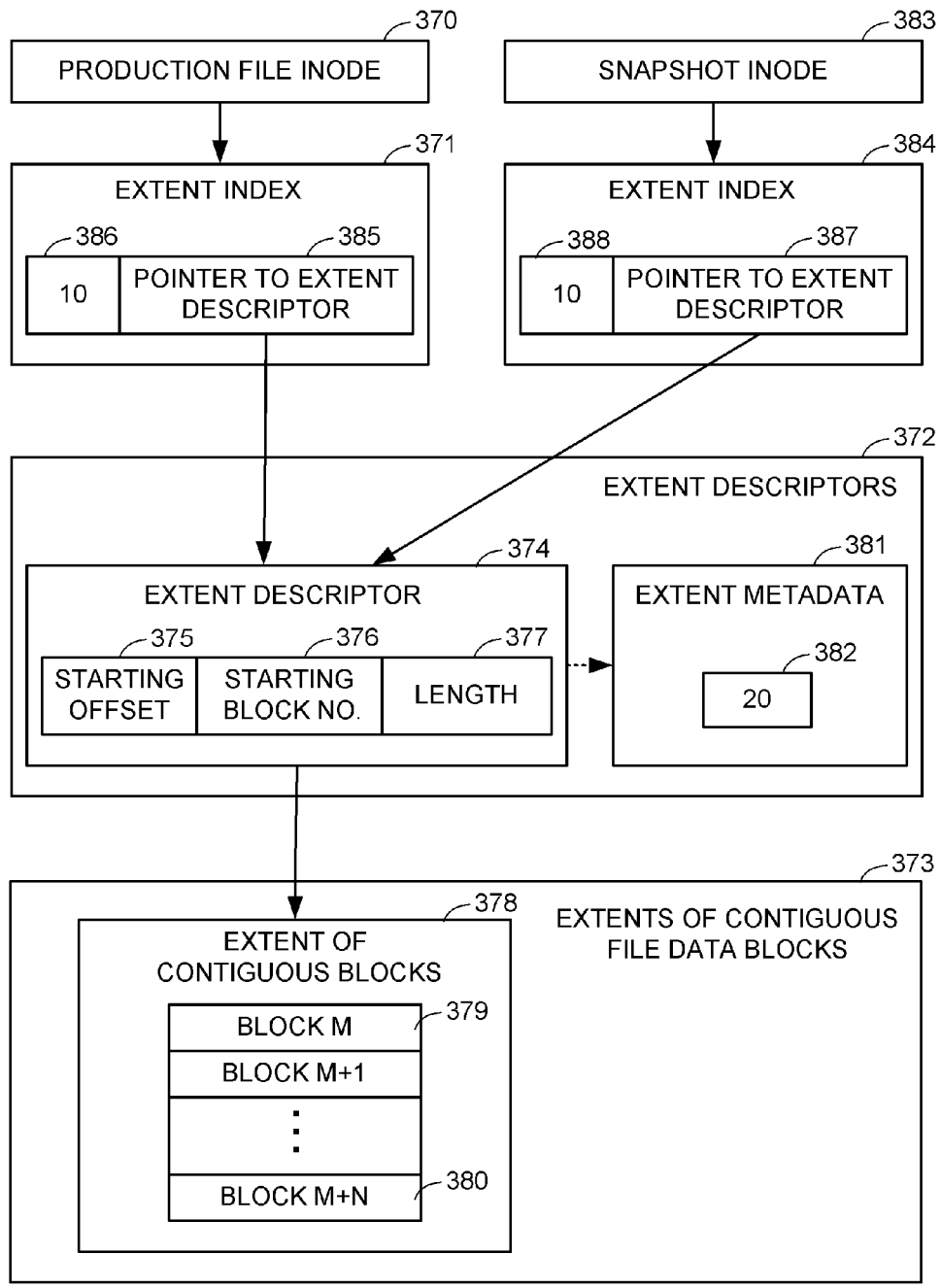
FIG. 25 is a block diagram of an alternative construction for the hierarchy of the file system, in which the file data blocks are allocated as extents of one or more data blocks having contiguous block addresses, and the file inodes are linked to the extents by extent indices and extent descriptors.

FIG. 25 shows a specific example of an extent-based file system in which extents 373 are shared between a production file and snapshots of the production file. In this example, the hierarchy of the production file includes a production file inode 370, an extent index 371, extent descriptors 372, and extents 373 of contiguous file data blocks. An extent descriptor 374 stores a starting offset 375, a starting block number 376, and length 377 in order to define an extent 378 of file data blocks 379, 380 having contiguous block addresses, such as contiguous block numbers M, M+1, . . . , M+N. The extent descriptor 374 has associated extent metadata 381 including a reference count 382.

As shown in FIG. 25, the extent 378 is shared between the production file and a snapshot of the production file. The snapshot includes a snapshot inode 383 and an extent index 384.

Each extent index 371, 384 includes a list of pointers to respective extent descriptors 372. For the extent 378 shared between the production file and the snapshot, the extent index 371 of the production file includes a pointer 385 to the extent descriptor 374, and the extent index 384 of the snapshot includes a pointer 387 to the extent descriptor 374. The pointer 385 has an associated delegated reference count 386 in the extent index 371, and the pointer 387 has an associated delegated reference count 388 in the extent index 384.

Each extent index 371, 372 is organized in such a way as to facilitate the search for an extent encompassing a given offset in the extent of a file. In general, this can be done by organizing each extent index 371, 372 as a list of pointers sorted by the starting offset associated with each pointer. A preferred organization is a B-tree, in which the sorted list of pointers is maintained as a hierarchy of nodes. Each parent node in the hierarchy has a sorted list of pointers to child nodes, and each node encompasses an offset range in the file. For an efficient search, the B-tree is balanced so that each intermediate node in the B-tree has about the same number of children. The balancing of the B-tree is done in a background operation, as the nodes in the B-tree grow in number and size on a priority basis in response to write operations upon the production file.

Figure 26:
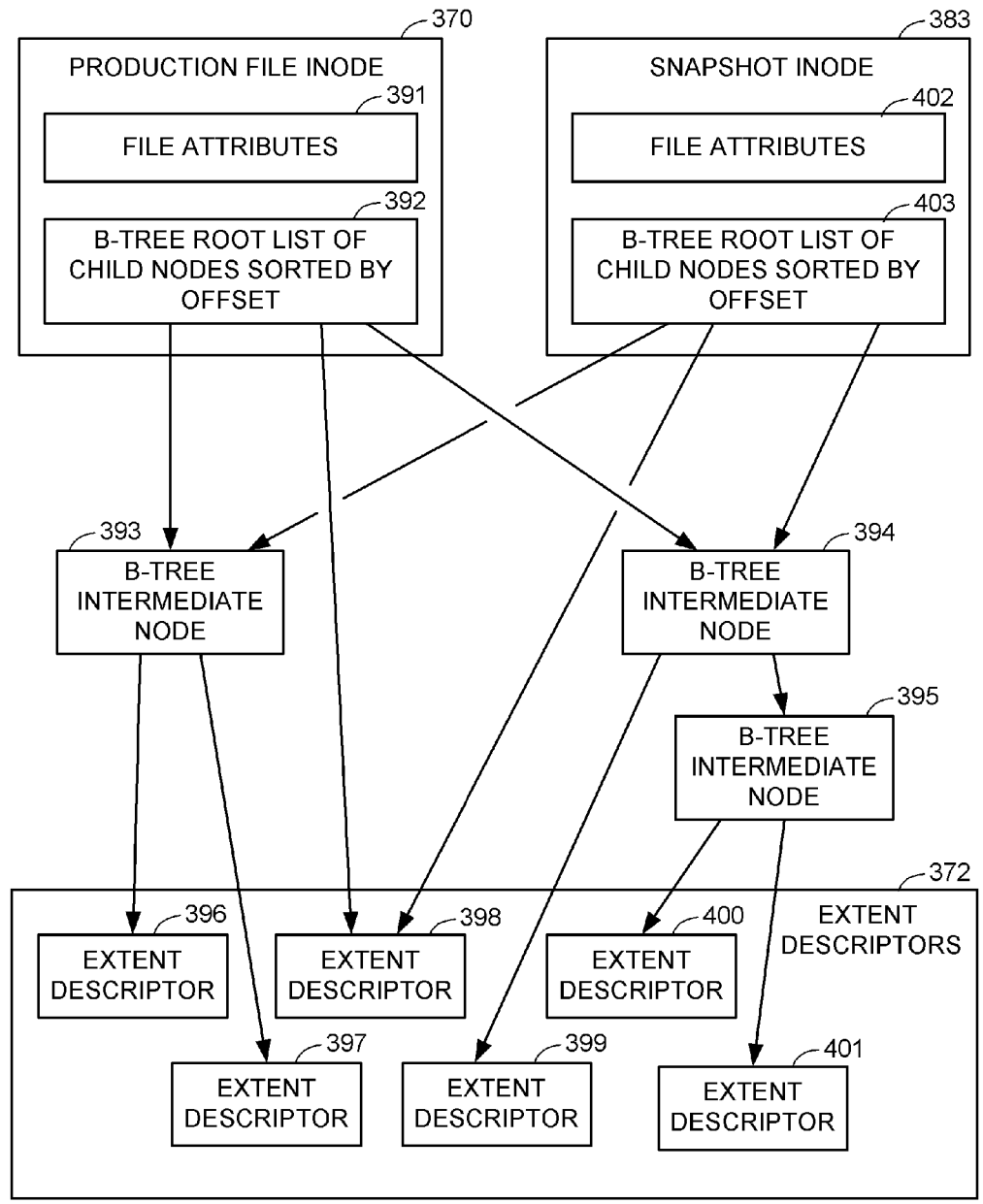
FIG. 26 is a block diagram showing that the extent indices in FIG. 25 can be implemented as B-trees having intermediate nodes disposed between the file inodes and the extent descriptors.

As shown in FIG. 26, B-tree intermediate nodes 393, 394, 395 as well as the extent descriptors 372 can be shared between the production file and snapshots of the production file. In this example, the production file inode 370 includes file attributes 391 of the production file, and a B-tree root list 392 of child nodes sorted by offset. A child node of the B-tree root list 392 is either a B-tree intermediate node or an extent descriptor. The leaf nodes in the B-tree are extent descriptors. Therefore, in the example of FIG. 26, the children of the B-tree root node 392 are the B-tree intermediate node 393, the extent descriptor 398, and the B-tree intermediate node 394. The children of the B-tree intermediate node 393 are the extent descriptors 396 and 397. The children of the B-tree intermediate node 394 are the extent descriptor 399 and the B-tree intermediate node 395. The children of the B-tree intermediate node 395 are the extent descriptor 400 and the extent descriptor 401.

When a snapshot is taken of the production file, a new snapshot inode 383 is allocated and the contents of the production file inode 370 are copied to the snapshot inode 383 so that the snapshot inode also includes file attributes 402 and a B-tree root list 403 sharing the child nodes of the production file inode B-tree root list 392.

In general, the sharing of the B-tree intermediate nodes 393, 394, and 395 between the production file inode 370 and the snapshot inode 383 can be managed in the same fashion as described above for the case of indirect file system blocks shared between a production file inode and a snapshot file inode. In this case, the B-tree intermediate nodes are treated in the same fashion as the indirect file system data blocks as described above, and the extent descriptors and their metadata are treated in the same fashion as the file system data blocks and their metadata as described above. In the context of the hierarchy of a file, an indirect file system block is one kind of intermediate node, and a B-tree intermediate node is another kind of intermediate node.

Figure 27:
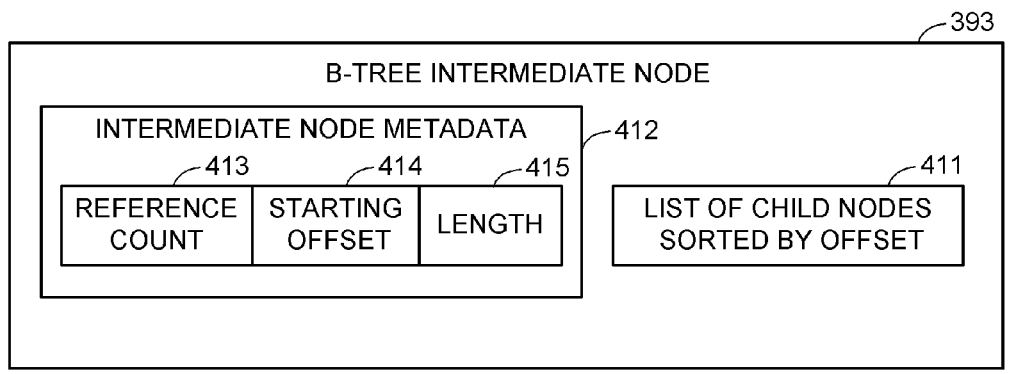
FIG. 27 is a block diagram of an intermediate node introduced in FIG. 26.

FIG. 27 shows an example of a B-tree intermediate node 393. The B-tree intermediate node 393 includes a list of child nodes sorted by offset, and intermediate node metadata 412. The intermediate node metadata 412 include a reference count 413, a starting offset 414, and a length 415. The starting offset 414 is the minimum of the starting offsets of the children of the B-tree intermediate node 393. The length 415 is the length from the starting offset 414 to the end of the extent of the child having the maximum starting offset. Therefore, during a search of the B-tree intermediate node for a given offset, if the given offset is outside of the range from the starting offset 414 to the starting offset 414 plus the length 415, then there is no need to search the list of child nodes 414. Otherwise, a binary search is used to search the list of child nodes 414 for a child node encompassing an extent including the given offset.

Figure 28:
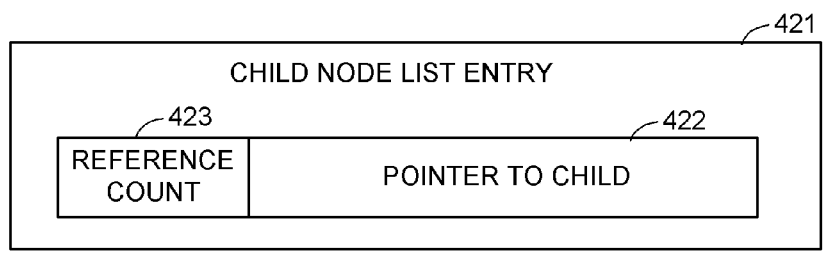
FIG. 28 is a block diagram of an entry in a list of child nodes in the intermediate node of FIG. 27.

FIG. 28 shows an example of a child list entry 421. The entry 421 includes a pointer to the child and an associated reference count. The child is an intermediate B-tree node or an extent descriptor.

The specific organization of the extent descriptor 374 in FIG. 25 and the child node list entry 421 in FIG. 28 assumes that the starting offset is an attribute of an extent descriptor. For a shared extent, this is a usual case for a production file and snapshots of the production file. However, in a file server having a de-duplication facility, extents may be shared between different production files, and in this case a shared extent may have a different starting offset in each production file. In this case, the starting offset is not a property of the extent, so that the starting offset should not be stored in the extent descriptor (374 in FIG. 25) and instead the starting offset should be stored in the child node list entry (421 in FIG. 28).

Figure 29:
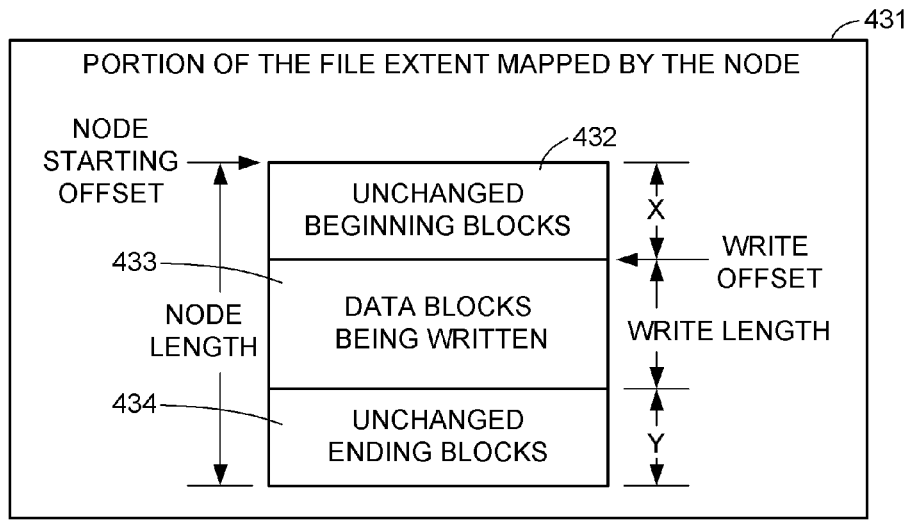
FIG. 29 is a block diagram of a file extent map in which the extent of a write request is contained within the extent of an intermediate node or extent descriptor in FIG. 26.

When a snapshot copy facility or a data duplication facility shares extents between a production file and a snapshot of the production file or another production file, it is desirable to augment the split technique described above so that an original shared intermediate node or shared extent may be split up into two or more nodes having different sub-extents of the original node. For example, FIG. 29 shows the portion 431 of the file extent mapped by the original node. This portion of the file extent is defined by the node starting offset and the node length. Assuming that the original node is shared by a production file and the file server receives a write request specifying an offset and a length falling within the portion 431 of the file extent mapped by the original node, then there may be a number "X" of unchanged beginning blocks 432, a number of data blocks being written 433, and a number "Y" of unchanged ending blocks.

If "X" and "Y" in FIG. 29 are each no more than a threshold, then the write operation should proceed as described above, by allocating a new node to be exclusively owned by the production file for storing new metadata for mapping the new block addresses for the new data being written. Thus, the original node is split to result in the original node for the old file mapping metadata and the new node for the new file mapping metadata. If "X" is more than the threshold, then the split should result in an additional shared node for mapping the unchanged beginning blocks 432. If "Y" is more than the threshold, then the split should result in still another shared node for mapping the unchanged ending blocks 434.

Figure 30:
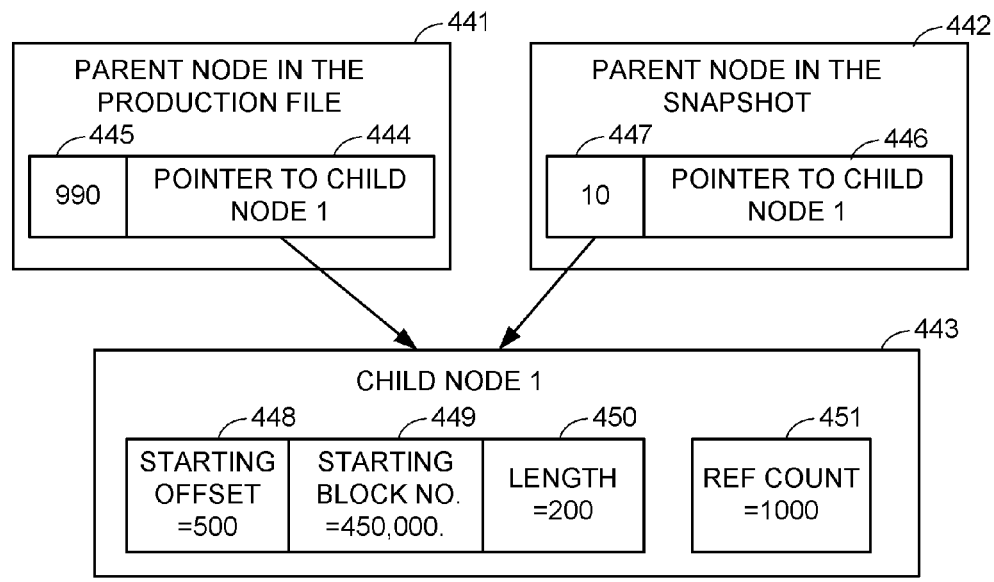
FIG. 30 is a block diagram showing a child node shared by a parent node in the production file and a parent node in the snapshot in the file system of FIG. 25.

For example, as shown in FIG. 30, a first child node 443 is shared between a parent node 441 in a production file and a parent node 442 in a snapshot. The parent node 441 in the production file includes a pointer 444 to the first child node 443 and an associated delegated reference count 445. The parent node 442 in the snapshot includes a pointer 446 to the first child node and an associated delegated reference count 447. The first child node 443 includes a starting offset 448, a starting block number 449, a length, and a reference count 445. Because the first child node 43 is shared between the parent node 441 in the production file and the parent node 442 in the snapshot, the reference count 451 in the first child node 443 has a value equal to the sum of the delegated reference count 335 associated with the pointer 444 to the first child node and the delegated reference count 447 associated with the pointer 446 to the first child node.

Assume that the file server receives a request to write data to a portion of the production file extent that is the ending half of the extent mapped by the first child node 443. For example, the write request specifies a starting offset of 600 and a length of 100. Thus, there are one-hundred unchanged beginning blocks "X", one-hundred new data blocks being written, and no unchanged ending blocks in the extent mapped by the first child node 443. The one hundred unchanged beginning blocks are greater than the threshold, so that the extent of the first child node should be split up into a second extent including the one-hundred unchanged beginning blocks and a third extent including the one-hundred new data blocks to be written.

Figure 31:
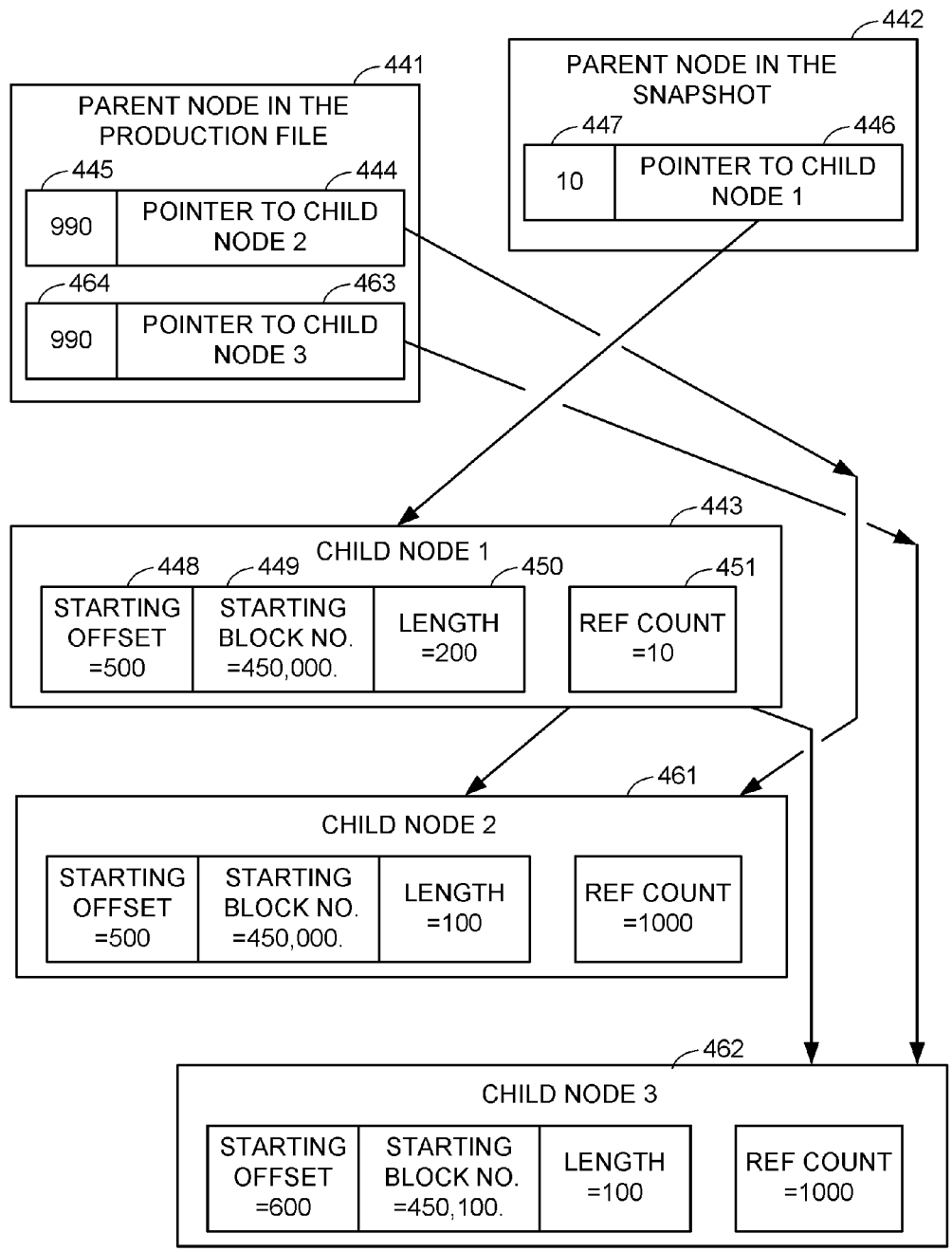
FIG. 31 is a block diagram showing two additional child nodes allocated and linked to the nodes of FIG. 30 in a split operation that splits the extent of the original child node into respective sub-extents of the two additional child nodes.

There is also a possibility that the child node 443 may be shared by multiple snapshots or by additional production files. To handle this possibility, as shown in FIG. 31, the first child node 443 is kept as a placeholder so that there is no need to find all the parent nodes and modify the pointers in these parent nodes to the first child node. The first child node 443 is unlinked from the production file parent node 441 and consequently the reference count 451 in the first child node 443 is decremented by the delegated reference count that was associated with the pointer to the first child node in the production file parent node 441. If this first child node is an extent descriptor, then this first child node is changed to a B-tree intermediate node.

A second child node 461 is allocated to map the one-hundred beginning blocks starting at the offset equal to 500. The second child node 461 is linked to the first child node 443 and linked to the production file parent node 441 so that the second child node 461 becomes a child of the first child node 443 and also a child of the production file parent node 441. The second child node 461 is initially set to have a full value reference count equal to 1000. The pointer 444 to the first child node in the production file parent node 441 is changed to point to the second child node 461. Its delegated reference count 445 is unchanged. In a similar fashion, a pointer to the second child node 461 is added to the child list of the first child node 443 and the delegated reference count associated with this pointer is set equal to the full value of 1000 minus the value of the delegated reference count 445 associated with the pointer 444 to the second child node in the production file parent node 441.

A third child node 462 is allocated to map the one-hundred data blocks being written to starting at the offset equal to 600. The third child node 462 is initially set to have a full value reference count equal to 1000. A new pointer 463 is added to the child list in the production file parent node 441 and this new pointer 463 points to the third child node 462. Its associated delegated reference count 464 is set equal to the delegated reference count (445 in FIG. 30) originally associated with the pointer (444 in FIG. 30) to the first child node 443. In a similar fashion, a pointer to the third child node 462 is added to the child list of the first child node 443 and the delegated reference count associated with this pointer is set equal to the full value of 1000 minus the value of the delegated reference count 464 associated with the pointer 463 to third child node in the production file parent node 441.

Figure 32:
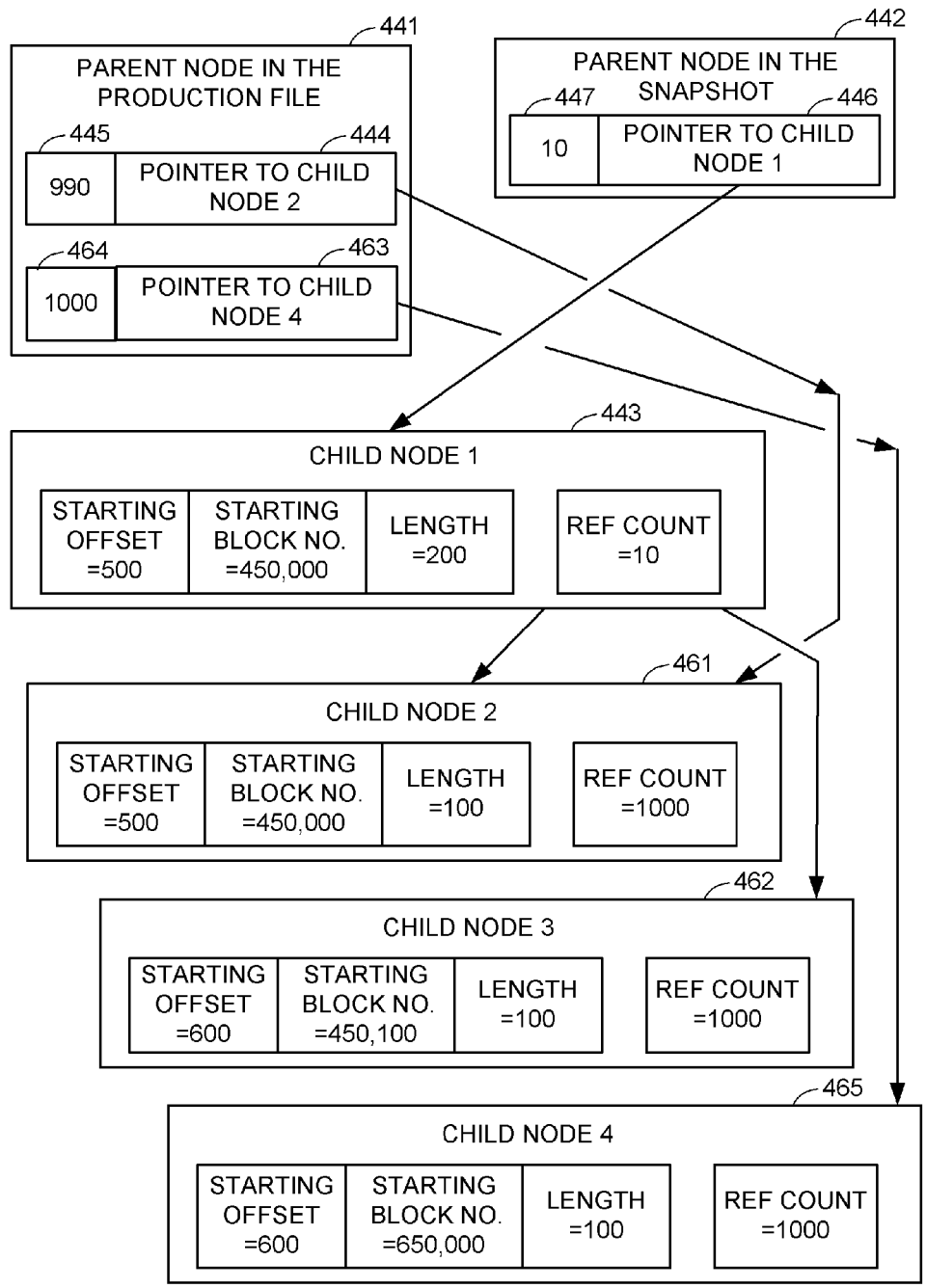
FIG. 32 is a block diagram showing an additional child node allocated and linked to the production file parent node in FIG. 31 for mapping data blocks newly allocated to the production file for storing new data of a write operation.

Then, as shown in FIG. 32, a fourth child node 465 is allocated to split the third child node in order to receive the block mapping metadata of a newly allocated extent (at a starting block number equal to 650,000) to receive the new data of the write request. The third child node 462 continues to map the original data blocks that are kept in the snapshot. The third child node 462 becomes an exclusive child of the first child node 443, and the fourth child node 465 becomes an exclusive child of the production file parent node 441. The reference count of the fourth child node 465 is set to a full value equal to 1000. The pointer 463 in the child node list of the production file parent node 441 is changed to point to the fourth child node 465, and the delegated reference count 464 associated with this pointer 463 is changed to a full value equal to 1000. Then execution continues so that the new data is written to the extent mapped by the fourth child node 465. The new data is written to the extent of file system data blocks starting at the block number 650,000 and ending at the block number 650,099.

Figure 33:
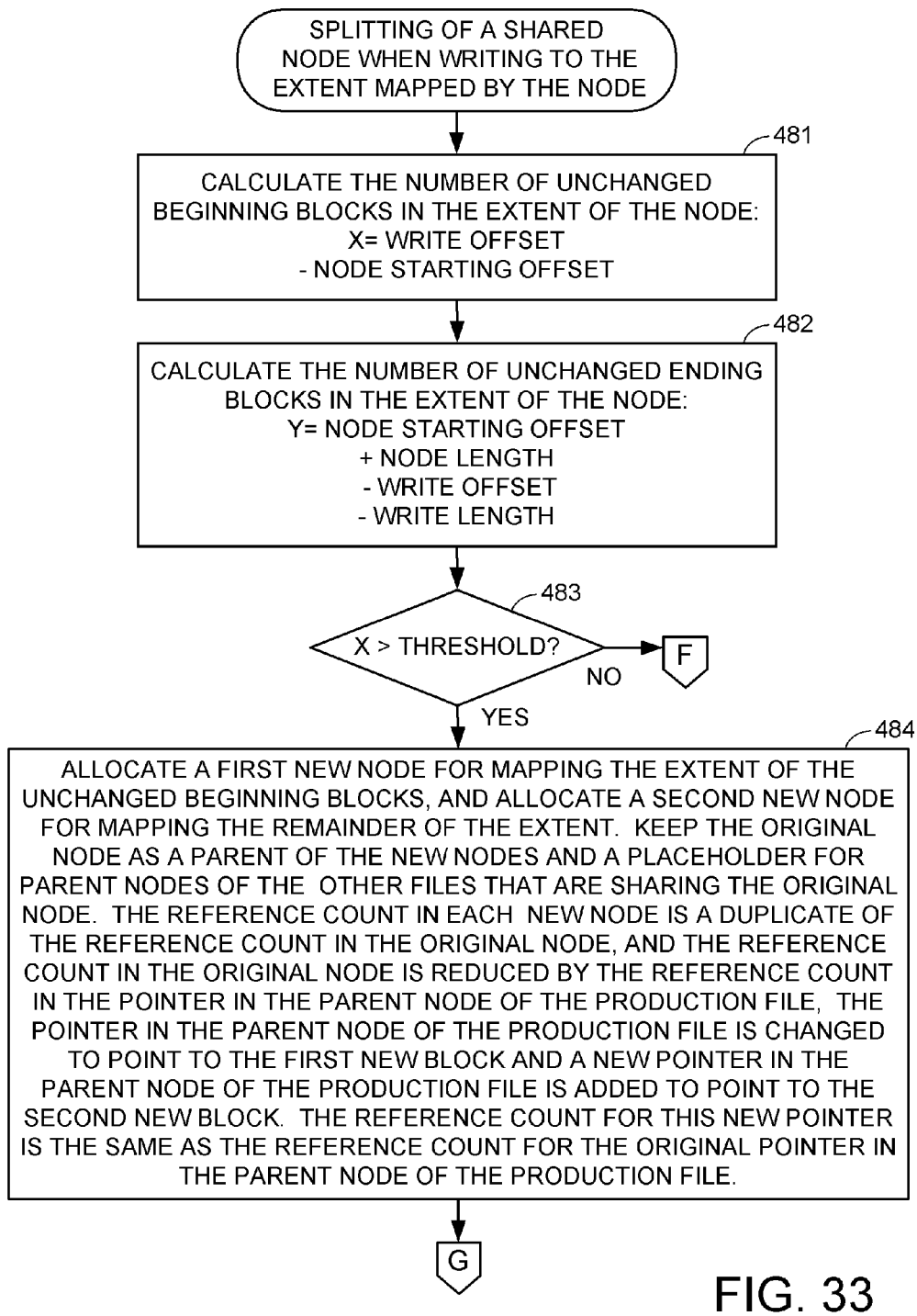

FIGS. 33 and 34 show a flowchart of the more complex method of splitting of a shared node when writing to the extent mapped by the node. In a first step 481, the number "X" of unchanged beginning blocks in the extent of the node is calculated by subtracting the node starting offset from the write offset. Next, in step 482, the number "Y" of unchanged ending blocks in the extent of the node is calculated by adding the node length to the node stating offset and subtracting the write offset and the write length. In step 483, if the number "X" of unchanged beginning blocks is greater than the threshold, then execution continues to step 484. In step 484, a first new node is allocated for mapping the extent of the unchanged beginning blocks, and a second new node is allocated for mapping the remainder of the extent. The original node is kept as a parent of the new nodes and a placeholder for parent nodes of other files that are sharing the original node. The reference count in each new node is a duplicate of the reference count in the original node, and the reference count in the original node is reduced by the reference count in the pointer in the parent node of the production file. The pointer in the parent node of the production file is changed to point to the first new block and a new pointer in the parent node of the production file is added to point to the second new block. The reference count for this new pointer is the same as the reference count of the original pointer in the parent node of the production file. Execution continues from step 484 to step 485 in FIG. 34.

In step 485 of FIG. 34, if the number "Y" of unchanged ending blocks is greater than the threshold, then execution continues to step 486. In step 486, a third new node is allocated for mapping the extent of the unchanged ending blocks, and the extent of the block mapping of the remainder node is split between the remainder node and the third new node. Thus, the third new node is linked to the original placeholder node and also linked to the parent node in the production file, in a fashion similar to the linking of the first new node to the original placeholder node and to the parent node in the production file, and similar to the linking of the second new node to the original placeholder node and to the parent node in the production file.

Execution continues from step 486 to step 489. Execution also branches from step 485 to step 489 if the number "Y" of unchanged ending blocks is not greater than the threshold. In step 483 of FIG. 33, if the number "X" of unchanged beginning blocks is not greater than the threshold, then execution continues to step 487 of FIG. 34. In step 487, if the number "Y" of unchanged ending blocks is not greater than the threshold, then execution continues to step 489. Otherwise, if the number "Y" of unchanged ending blocks is greater than the threshold, then execution branches to step 488.

In step 488, a first new node is allocated for mapping the extent of the unchanged ending blocks, and a second new node is allocated for mapping the remainder of the extent of the original node. The original node is kept as a parent of the new nodes and a placeholder for parent nodes of other files that are sharing the original node. The new nodes are linked to the parent node in the production file so that they are also children of the parent node in the production file, in a fashion similar to the linking of the first and second new nodes described above with respect to step 484 in FIG. 33. After step 488, execution continues to step 489.

In step 489, the node encompassing the write extent is split by allocating a new node to be exclusively owned by the production file. The reference count in the metadata of the original node encompassing the write extent is decremented by the delegated reference count in the pointer field of the production file parent node that pointed to this original node. Then the reference count in the metadata of the new node and in the pointer field of the production file parent node that pointed to the original node encompassing the write extent is assigned a full-weight value, and the pointer in this pointer field is updated to point to the new node. Execution then returns, so that the new data is written to the write extent mapped by the new node exclusively owned by the production file.

FIGS. 35-39 show a method of snapshot copy and data duplication using delegated weighted reference counts for indicating exclusive ownership of intermediate nodes and extent descriptors in a file system sharing intermediate nodes and extent descriptors among files. In a first step 501 of FIG. 35, when a production file does not yet share intermediate nodes or extent descriptors with another file, a fully weighted reference count is initially assigned to each child pointer field in the production file inode and each intermediate node of the production file and to the metadata of each intermediate node of the production file and each extent descriptor of the production file. Next, in step 502, the snapshot copy facility is invoked for operation upon the production file, and the data de-duplication facility is also invoked for operation upon the production file.

In step 503, each time that the data de-duplication facility causes an intermediate node or extent descriptor to become shared with another inode or intermediate node, for example because a file is created or extended or new data is written to a file, the data de-duplication facility increments the reference count in the metadata of the intermediate node or the extent descriptor by a full weight. In step 504, each time that the data de-duplication causes an intermediate node or an extent descriptor to be no longer shared with another inode or intermediate node, for example because a file is deleted or truncated or new data is written to a file, the data de-duplication facility decrements the reference count in the metadata of the intermediate node or extent descriptor by the delegated reference count associated with the pointer in the parent node that is being unlinked from the intermediate node or extent descriptor, and this pointer is the pointer that is pointing to the intermediate node or extent descriptor. If the data de-duplication facility decrements the reference count to zero, then the data de-duplication facility de-allocates the intermediate node or extent descriptor by returning the intermediate node or extent descriptor to a list of free intermediate nodes or a list of free extent descriptors.

Figure 36:
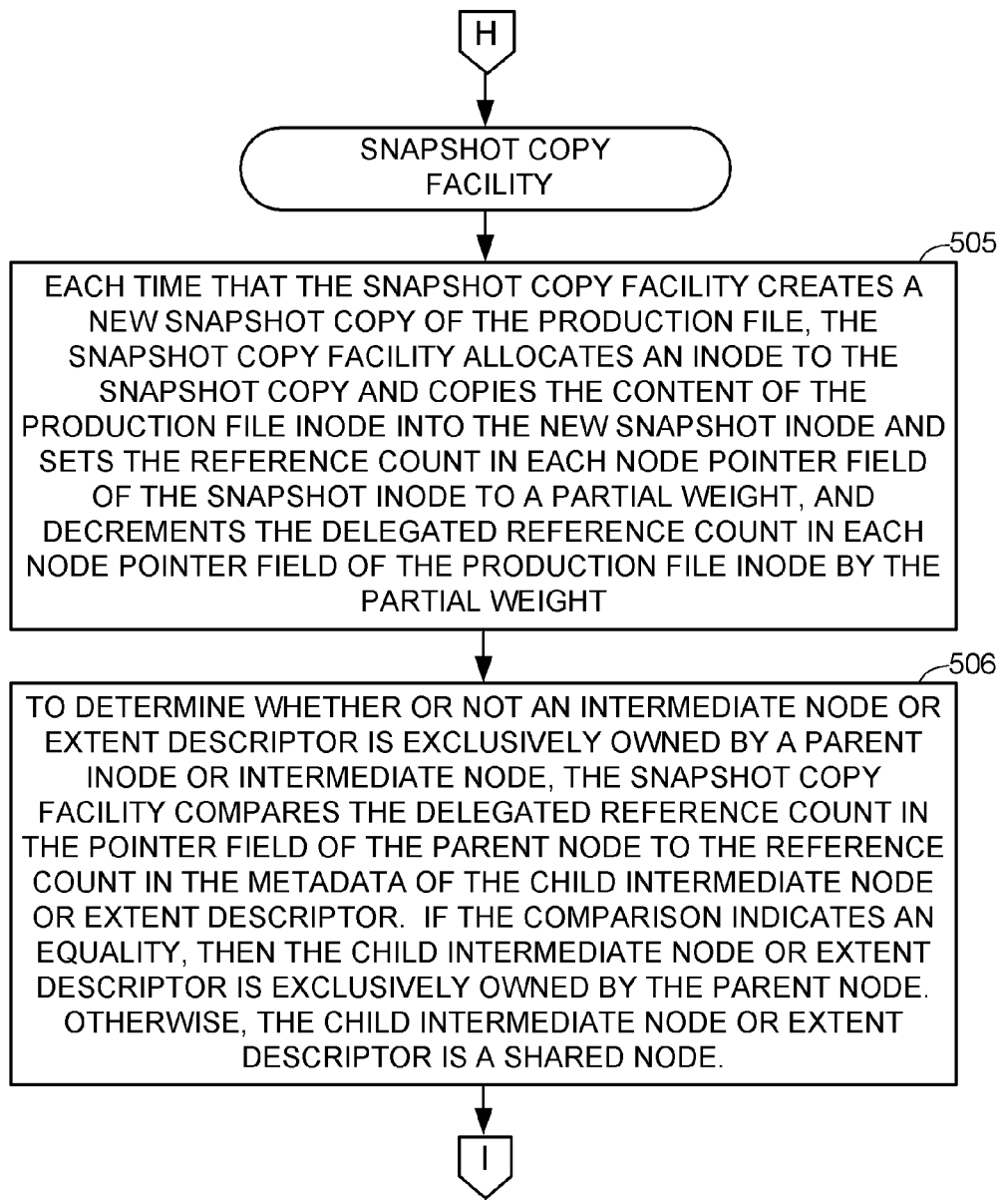

In step 505 of FIG. 36, each time that the snapshot copy facility creates a new snapshot copy of the production file, the snapshot copy facility allocates an inode to the snapshot copy and copies the content of the production file inode into the new snapshot inode and sets the delegated reference count in each child pointer field of the snapshot inode to a partial weight, and decrements the delegated reference count in each child pointer field of the production file inode by the partial weight. In step 506, to determine whether or not an intermediate node or extent descriptor is exclusively owned by a parent inode or intermediate node, the snapshot copy facility compares the delegated reference count in the pointer field of the parent node to the reference count in the metadata of the child intermediate node or extent descriptor. If the comparison indicates equality, then the child intermediate node or extent descriptor is exclusively owned by the parent node. Otherwise, the child intermediate node or extent descriptor is a shared node.

Figure 37:
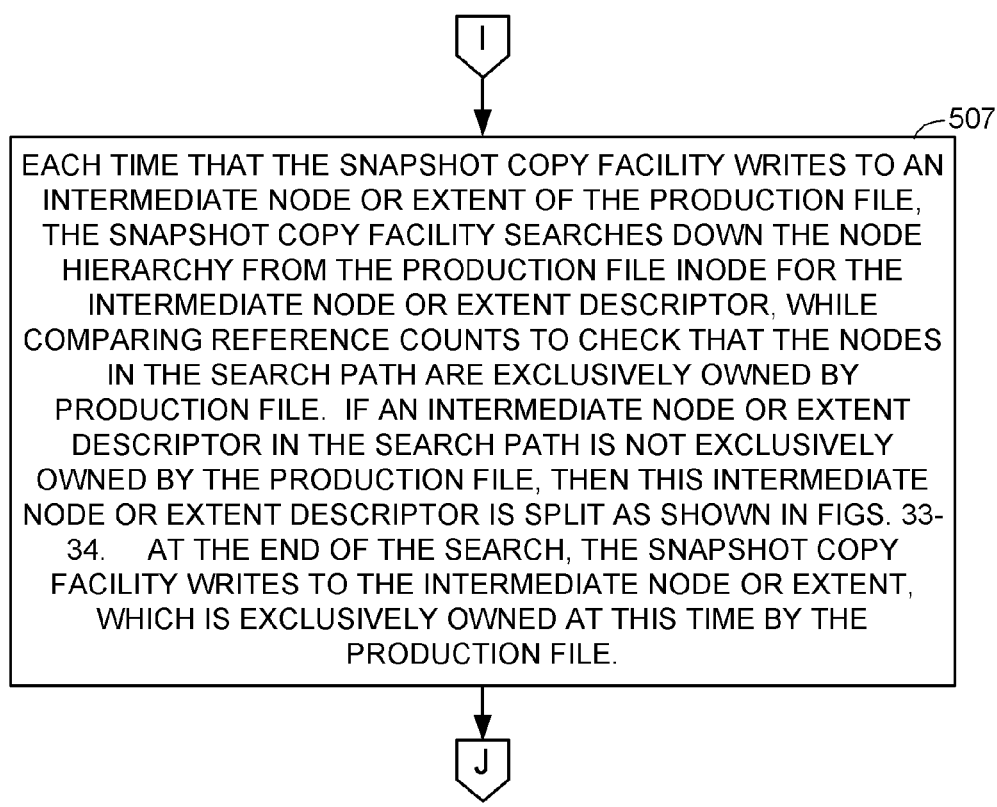

In step 507 of FIG. 37, each time that the snapshot copy facility writes to an intermediate node or extent descriptor of the production file, the snapshot copy facility searches down the node hierarchy from the production file inode for the intermediate node or extent descriptor, while comparing reference counts to check that the nodes in the search path are exclusively owned by the production file inode. If an intermediate node or the extent descriptor is not exclusively owned by the production file inode, then this intermediate node or extent descriptor is split as shown in FIGS. 33-34. At the end of the search, the snapshot copy facility writes to the intermediate node or extent descriptor, which is exclusively owned at this time by the production file inode.

Figure 38:
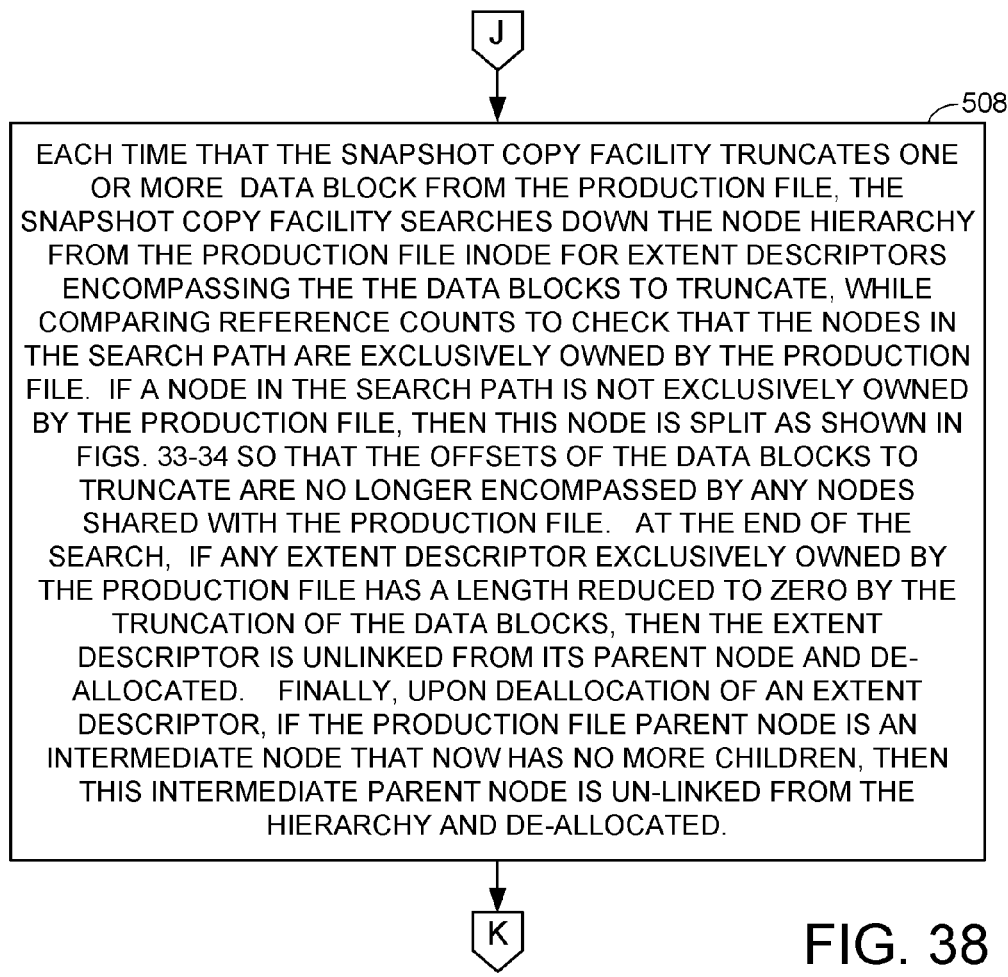

In step 508 of FIG. 38, each time that the snapshot copy facility truncates one or more data blocks from the production file, the snapshot copy facility searches down the node hierarchy from the production file inode for extent descriptors encompassing the data blocks to truncate, while comparing reference counts to check that the nodes in the search path are exclusively owned by the production file. If a node in the search path is not exclusively owned by the production file, then this node is split as shown in FIGS. 33-34 so that the offsets of the blocks to truncate are no longer encompassed by any nodes that are in the search path and shared with the production file. At the end of this search, if any extent descriptor exclusively owned by the production file has a length that has been reduced to zero by the truncation of the data blocks from the extent, then the snapshot copy facility unlinks the extent descriptor from its production file parent node and returns it to the list of free extent descriptors. If the production file parent node is an intermediate node that no longer has any children, it also is unlinked from the node hierarchy and deallocated. This deallocation process may continue up the node hierarchy until the production file inode no longer has any children.

Figure 39:
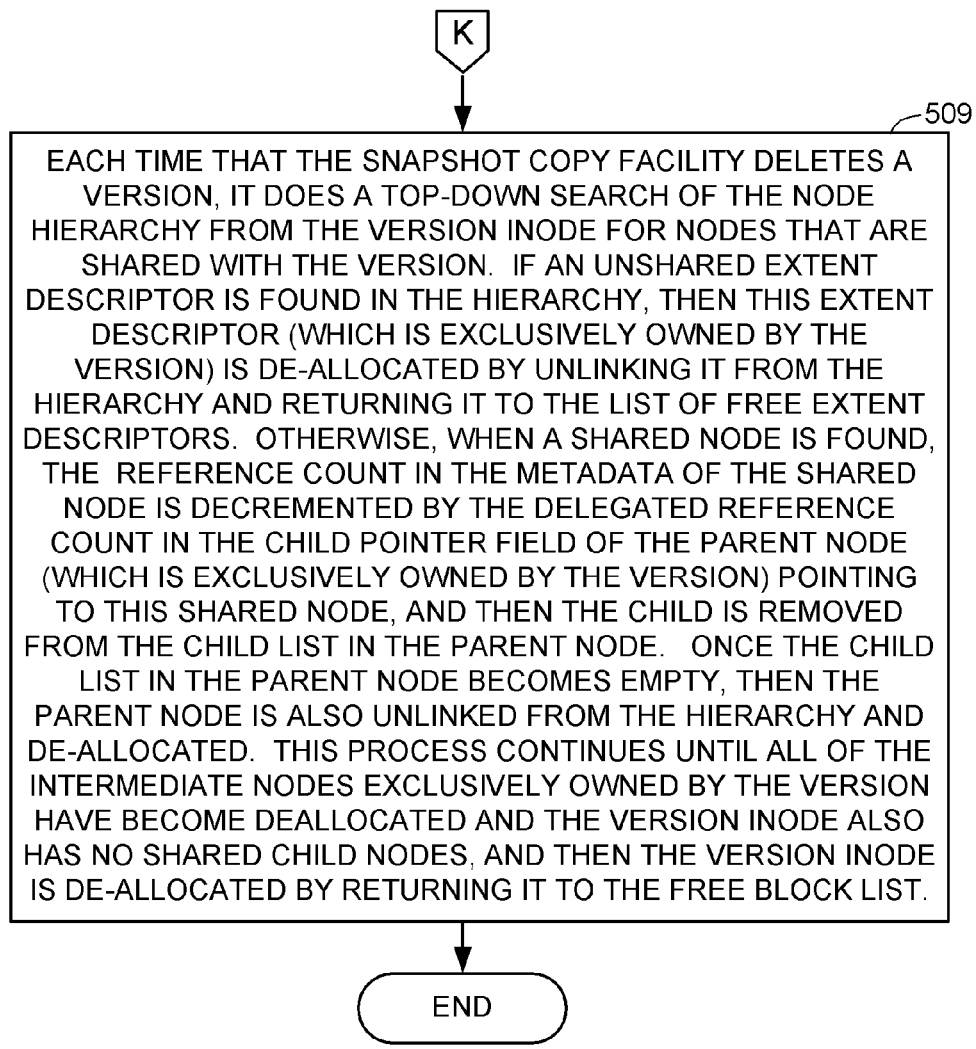

In step 509 of FIG. 39, each time that the snapshot copy facility deletes a version (i.e., a production file or a snapshot copy of the production file), the snapshot copy facility does a top-down search of the node hierarchy from the version inode for nodes that are shared with the version. If an unshared extent descriptor is found in the hierarchy, then this extent descriptor (which is exclusively owned by the version) is de-allocated by unlinking it from the hierarchy and returning it to the list of free extent descriptors. Otherwise, when a shared node is found, the reference count in the metadata of the shared node is decremented by the delegated reference count in the child pointer field of the parent node (which is exclusively owned by the version) pointing to this shared node, and then the shared node is removed from the child list in the parent node to unlink the shared node from the parent node. Once the child list in the parent node becomes empty, the parent node is also unlinked from the node hierarchy and de-allocated by returning the parent node to the list of free intermediate nodes. This process continues until all of the intermediate nodes exclusively owned by the version have been deallocated and the version inode also has no shared child nodes, and then the version inode is de-allocated by returning it to a free inode list.

In view of the above, there has been described a snapshot copy facility that maintains information indicating ownership and sharing of child nodes in the hierarchy of a file between successive versions by delegating reference counts to parent-child relationships between the nodes, as indicated by pointers in the parent nodes. The parent nodes may include inodes and intermediate nodes such as indirect blocks or B-tree index nodes, and the child nodes may include the intermediate nodes and extent descriptors or data blocks. When a child node becomes shared between a parent node of the production file and a parent node of a snapshot copy, the delegated reference count is split among the parent nodes. This method is compatible with a conventional data de-duplication facility, and avoids a need to update reference counts in metadata of child nodes of a shared intermediate node upon splitting the shared intermediate node when writing to a production file.

What is claimed is:

1. A method of operating a network file server having a network adapter coupling the network file server to a data network of client computers, data storage storing files, and a data processor coupled to the data storage and the network adapter for access of the client computers to the files stored in the data storage, the files in the data storage being organized as a hierarchy including inodes and data blocks, the files stored in the data storage including a production file having a first data block in the hierarchy, the first data block being a descendant of the production file inode in the hierarchy, said method comprising:

storing in the data storage a reference count for the first data block, and storing in the data storage a delegated reference count for the relationship of the production file inode and the first data block;

the data processor creating in the data storage a snapshot copy of the production file by allocating a snapshot copy inode and sharing the first data block between the production file inode and the snapshot copy inode so that the first data block becomes a descendant of the snapshot copy inode, and splitting the delegated reference count between the relationship of the production file inode and the first data block and the relationship of the snapshot copy inode and the first data block; and the data processor responding to a request from one of the client computers for writing data to the production file at an offset encompassed by the first data block by comparing the delegated reference count for the relationship of the production file inode and the first data block to the reference count for the first data block, and upon finding that the comparison indicates that the first data block is a shared block, allocating a second data block, writing to the second data block and decrementing the reference count for the first data block by the delegated reference count for the relationship of the production file inode and the first data block and linking the second data block to the production file inode in place of the first data block so that the second data block becomes a descendant of the production file inode and the first data block is no longer a descendant of the production file inode.

2. The method as claimed in claim 1, wherein the comparison indicates that the first data block is a shared block when the delegated reference count for the relationship of the production file inode and the first data block is not equal to the reference count for the first data block.

3. The method as claimed in claim 1, wherein the reference count for the first data block and the delegated reference count for the relationship of the production file inode and the first data block are set equal to a full-weight value before any snapshot copies have been made of the production file when the first data block is not shared with any other file in data storage, and wherein the delegated reference count is split between the relationship of the production file inode and the first data block and the relationship of the snapshot copy inode and the first data block by setting a delegated reference count for the relationship of the snapshot copy inode to a partial-weight value and decrementing the delegated reference count for the relationship of the production file inode and the first data block by the partial-weight value, wherein the partial-weight value is less than the full-weight value.

4. The method as claimed in claim 3, which further includes decrementing the reference count for the data block by the delegated reference count for the relationship of the snapshot copy inode and the first data block when the snapshot copy of the production file is deleted.

5. The method as claimed in claim 3, which further includes de-duplicating data of another file by changing a pointer in an inode of said another file to point to the second data block, and incrementing the reference count for the second data block by the full-weight value.

6. The method as claimed in claim 1, wherein a pointer to the first data block is stored in a pointer field of the production file inode, and the method further includes storing the delegated reference count for the relationship of the production file inode and the first data block in the pointer field of the production file inode.

7. The method as claimed in claim 6, which further includes de-duplicating data of another file by changing a pointer in an inode of said another file to point to the second data block, and incrementing the reference count for the second data block by a value of a delegated reference count in a pointer field containing the pointer in the inode of said another file.

8. The method as claimed in claim 1, wherein the production file also includes a first intermediate node that is a descendant of the production file inode in the hierarchy, and the method further includes the data processor responding to another request from said one of the client computers for writing data to the production file at an offset encompassed by the first intermediate node by comparing a delegated reference count for the relationship of the production file inode and the first intermediate node to a reference count for the first intermediate node, and upon finding that the comparison indicates that the first intermediate node is a shared node, allocating a second intermediate node, decrementing the reference count for the first intermediate node by the delegated reference count for the relationship of the production file inode and the first intermediate node and linking the second intermediate node to the production file inode in place of the first intermediate node so that the second intermediate node becomes a descendant of the production file inode and the second intermediate node is no longer a descendant of the production file inode, and writing data to the production file at the offset encompassed by the first intermediate node.

9. A method of operating a network file server having a network adapter coupling the network file server to a data network of client computers; data storage storing files, and a data processor coupled to the data storage and the network adapter for access of the client computers to the files stored in the data storage, the files in the data storage being organized as a hierarchy including inodes, intermediate nodes, and data blocks, the files stored in the data storage including a production file having a first intermediate node in the hierarchy, the first intermediate node being a descendant of the production file inode in the hierarchy, said method comprising:

storing in the data storage a reference count for the first intermediate node, and storing in the data storage a delegated reference count for the relationship of the production file inode and the first intermediate node, the data processor creating in the data storage a snapshot copy of the production file by allocating a snapshot copy inode and sharing the first intermediate node between the production file inode and the snapshot copy inode so that the first intermediate node becomes a descendant of the snapshot copy inode, and splitting the delegated reference count between the relationship of the production file inode and the first intermediate node and the relationship of the snapshot copy inode and the first intermediate node by setting a delegated reference count for the relationship of the snapshot copy inode and the first intermediate node to a value less than the delegated reference count for the relationship of the production file inode and the first intermediate node and decrementing the delegated reference count for the relationship of the production file inode and the first intermediate node by said value;

the data processor responding to a request from one of the client computers for writing data to the production file at an offset encompassed by the first intermediate node by comparing the delegated reference count for the relationship of the production file inode and the first intermediate node to the reference count for the first intermediate node, and upon finding that the comparison indicates that the first intermediate node is a shared intermediate node, allocating a second intermediate node and decrementing the reference count for the first intermediate node by the delegated reference count for the relationship of the production file inode and the first intermediate node and linking the second intermediate node to the production file inode in place of the first intermediate node so that the second intermediate node becomes a descendant of the production file inode and the first intermediate node is no longer a descendant of the production file inode, and writing the data to the production file at the offset encompassed by the first intermediate node.

10. The method as claimed in claim 9, wherein the comparison indicates that the first intermediate node is a shared intermediate node when the delegated reference count for the relationship of the production file inode and the first intermediate node is not equal to the reference count for the first intermediate node.

11. The method as claimed in claim 9, wherein a pointer to the first intermediate node is stored in a pointer field of the production file inode, and wherein the method further includes storing the delegated reference count for the relationship of the production file inode and the first intermediate node in the pointer field of the production file inode.

12. A network file server comprising:
a network adapter for coupling the network file server to a data network of client computers;
data storage storing files; and
a data processor coupled to the data storage and the network adapter for access of the client computers to the files stored in the data storage;
the files in the data storage being organized as a hierarchy including inodes and data blocks, the files stored in the data storage including a production file having a first data block in the hierarchy, the first data block being a descendant of the production file inode in the hierarchy, and the data storage storing a reference count for the first data block, and the data storage storing a delegated reference count for the relationship of the production file inode and the first data block;
the data processor being programmed with a snapshot copy facility, the snapshot copy facility being executable by the data processor to create in the data storage a snapshot copy of the production file by allocating a snapshot copy inode and sharing the first data block between the production file inode and the snapshot copy inode so that the first data block becomes a descendant of the snapshot copy inode, and splitting the delegated reference count between the relationship of the production file inode and the first data block and the relationship of the snapshot copy inode and the first data block; and
the snapshot copy facility being executable by the data processor to respond to a request from one of the client computers for writing data to the production file at an offset encompassed by the first data block by comparing the delegated reference count for the relationship of the production file inode and the first data block to the reference count for the first data block, and upon finding that the comparison indicates that the first data block is a shared block, allocating a second data block, writing to the second data block and decrementing the reference count for the first data block by the delegated reference count for the relationship of the production file inode and the first data block and linking the second data block to the production file inode in place of the first data block so that the second data block becomes a descendant of the production file inode and the first data block is no longer a descendant of the production file inode.

13. The network file server as claimed in claim 12, wherein the comparison indicates that the first data block is a shared block when the delegated reference count for the relationship of the production file inode and the first data block is not equal to the reference count for the first data block.

14. The network file server as claimed in claim 12, wherein the reference count for the first data block and the delegated reference count for the relationship of the production file inode and the first data block are set equal to a full-weight value before any snapshot copies have been made of the production file when the first data block is not shared with any other file in data storage, and wherein the delegated reference count is split between the relationship of the production file inode and the first data block and the relationship of the snapshot copy inode and the first data block by setting a delegated reference count for the relationship of the snapshot copy inode to a partial-weight value and decrementing the delegated reference count for the relationship of the production file inode and the first data block by the partial-weight value, wherein the partial-weight value is less than the full-weight value.

15. The network file server as claimed in claim 14, wherein the snapshot copy facility is further executable by the data processor to decrement the reference count for the first data block by the delegated reference count for the relationship of the snapshot copy inode and the first data block when the snapshot copy of the production file is deleted.

16. The network file server as claimed in claim 14, wherein the data processor is further programmed with a data de-duplication facility, and the data de-duplication facility is executable by the data processor to de-duplicate data of another file by changing a pointer in an inode of said another file to point to the second data block, and incrementing the reference count for the second data block by the full-weight value.

17. The network file server as claimed in claim 12, wherein a pointer to the first data block is stored in a pointer field of the production file inode, and the delegated reference count for the relationship of the production file inode and the first data block also is stored in the pointer field of the production file inode.

18. The network file server as claimed in claim 17, wherein the data processor is further programmed with a data de-duplication facility, and the data de-duplication facility is executable by the data processor to de-duplicate data of the production file by changing a pointer in an intermediate node of the production file to point to the first data block, and incrementing the reference count for the first data block by a value of a delegated reference count in a pointer field containing the pointer in the intermediate node of the production file.

19. The network file server as claimed in claim 17, wherein the data processor is further programmed with a data de-duplication facility, and the data de-duplication facility is executable by the data processor to de-duplicate data of another file by changing a pointer in an inode of said another file to point to the first data block, and incrementing the reference count for the first data block by a value of a delegated reference count in a pointer field containing the pointer in the inode of said another file.

20. The network file server as claimed in claim 12, wherein the production file also includes a first intermediate node that is a descendant of the production file inode in the hierarchy, and the snapshot copy facility is further executable by the data processor to respond to another request from said one of the client computers for writing data to the production file at an offset encompassed by the first intermediate node by comparing a delegated reference count for the relationship of the production file inode and the first intermediate node to a reference count for the first intermediate node, and upon finding that the comparison indicates that the first intermediate node is a shared intermediate node, allocating a second intermediate node, and decrementing the reference count for the first intermediate node by the delegated reference count for the relationship of the production file inode and the first intermediate node and linking the second intermediate node to the production file inode in place of the first intermediate node so that the second intermediate node becomes a descendant of the production file inode and the second intermediate node is no longer a descendant of the production file inode, and writing data to the production file at the offset encompassed by the first intermediate node.

* * * * *